(12) United States Patent
Tupper et al.

(10) Patent No.: US 6,177,746 B1
(45) Date of Patent: Jan. 23, 2001

(54) LOW INDUCTANCE ELECTRICAL MACHINE

(76) Inventors: Christopher N. Tupper; Duncan G. Wood, both of 14 Industrial Pkwy., Brunswick, ME (US) 04011

(*) Notice: Under 35 U.S.C. 154(b), the term of this patent shall be extended for 0 days.

(21) Appl. No.: 09/579,085

(22) Filed: May 25, 2000

Related U.S. Application Data

(63) Continuation-in-part of application No. 09/422,476, filed on Oct. 21, 1999.

(51) Int. Cl.$^7$ .............. H02K 16/00; H02K 1/00; H02K 1/10; H02K 3/04; H02K 21/12
(52) U.S. Cl. .............. 310/166; 310/114; 310/185; 310/186; 310/156; 310/254; 310/210; 310/268
(58) Field of Search .............. 310/164, 156, 310/179, 152, 180, 181, 182, 183, 184, 185, 153, 197, 210, 166, 254, 261, 268, 186, 74, 114

(56) References Cited

U.S. PATENT DOCUMENTS

| | | | |
|---|---|---|---|
| 2,823,545 | * 3/1958 | Bodge | 310/164 |
| 2,997,611 | 8/1961 | Feiner et al. | 310/164 |
| 3,858,071 | 12/1974 | Griffing et al. | 310/266 |
| 3,916,284 | 10/1975 | Hilgendorf | 363/10 |
| 4,087,711 | 5/1978 | Kirtley et al. | 310/184 |
| 4,488,075 | * 12/1984 | DeCesare | 310/156 |
| 4,547,713 | 10/1985 | Langley et al. | 318/254 |
| 4,563,606 | 1/1986 | Fukasawa et al. | 310/208 |
| 5,124,605 | 6/1992 | Bitterly et al. | 310/74 |
| 5,440,185 | * 8/1995 | Allwine, Jr. | 310/156 |
| 5,565,836 | 10/1996 | Groehl et al. | 310/180 |
| 5,606,210 | * 2/1997 | Lin | 310/153 |
| 5,798,594 | 8/1998 | Radovsky et al. | 336/225 |
| 6,051,959 | 4/2000 | Tupper | 322/78 |

* cited by examiner

*Primary Examiner*—Nestor Ramirez
*Assistant Examiner*—Guillermo Perez
(74) *Attorney, Agent, or Firm*—Pierce Atwood; Chris A. Caseiro

(57) ABSTRACT

A low inductance electrical machine that may be used as an alternator or motor with low armature inductance is disclosed. Arrangements of complementary armature windings are presented in which the fluxes induced by currents in the armature windings effectively cancel leading to low magnetic energy storage within the machine. This leads to low net flux levels, low core losses, low inductance and reduced tendency toward magnetic saturation. The inclusion of additional gaps in the magnetic circuit allows for independent adjustment of air gap geometry and armature inductance. Separately excited field arrangements are disclosed that allow rotor motion to effect brush-less alternator or brushless motor operation. An exemplary geometry includes a stator including two annular rings and a concentric field coil together with a rotor structure separated from the stator by four air gaps.

20 Claims, 15 Drawing Sheets

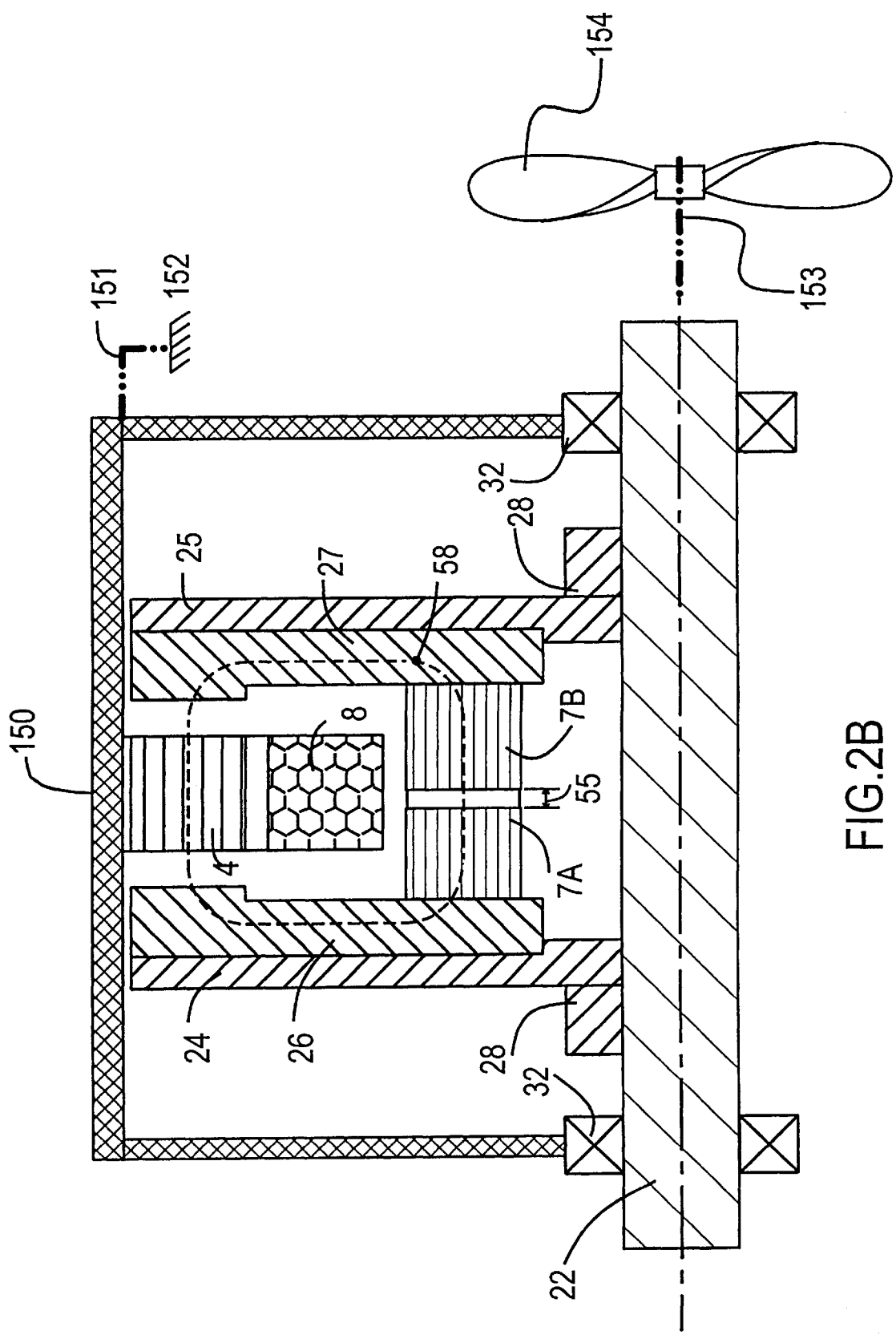

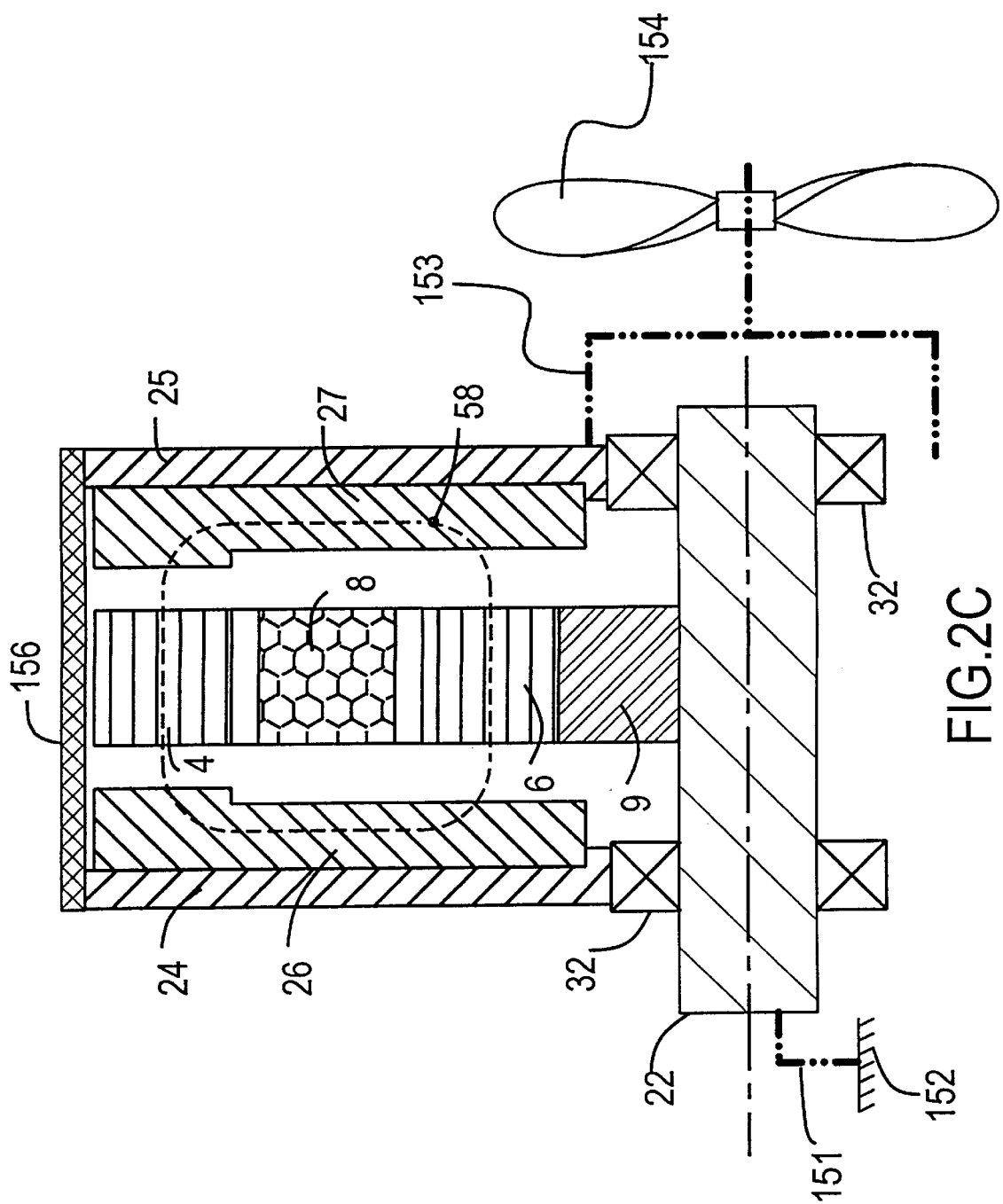

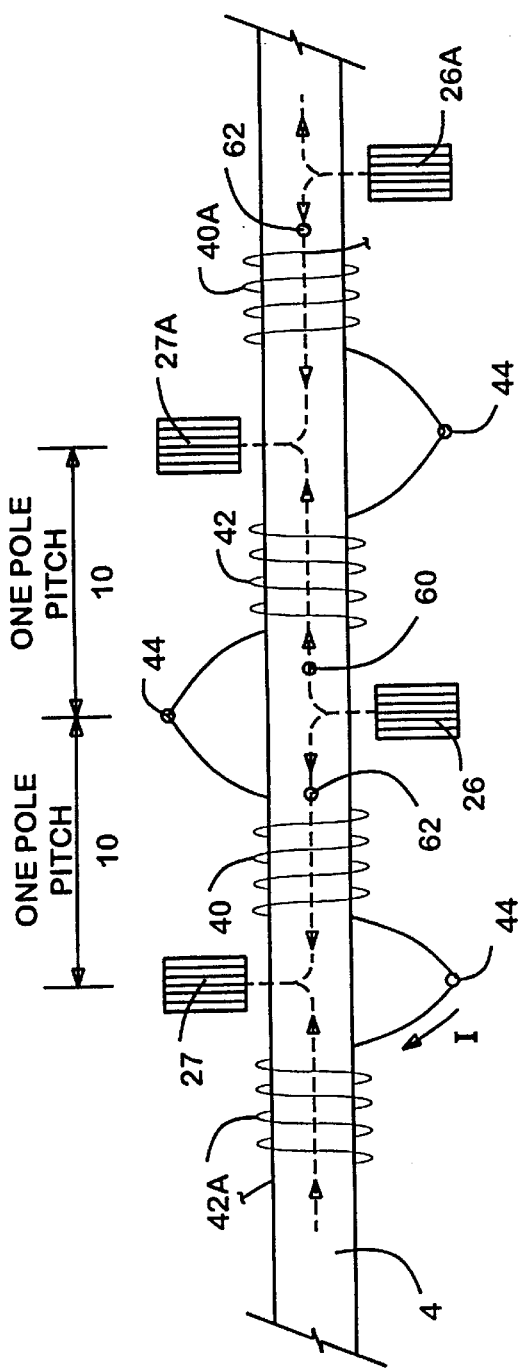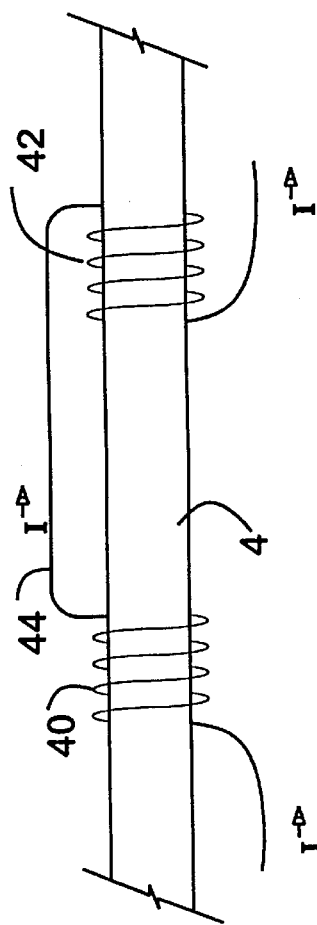
FIG. 3A
FIG. 3B

Numbers in circles indicate relative flux intensity levels of associated arrows

LOW INDUCTANCE ELECTRICAL MACHINE

CROSS REFERENCE TO RELATED PATENT APPLICATION

This patent application is a continuation-in-part (CIP) of the co-pending Christopher N. Tupper et al. U.S. patent application Ser. No. 09/422,476 filed Oct. 21, 1999, for LOW INDUCTANCE ELECTRICAL MACHINE. The content of the related patent application is incorporated herein by reference.

BACKGROUND OF INVENTION

1. Field of Invention

This invention relates generally to the design of electrical machines, and more particularly to the design of alternators, generators, and motors having low inductance in the armature circuits.

2. Description of the Prior Art

As is well understood by those skilled in the art, electrical machines have an internal impedance that interacts with other system impedance to determine the performance of the combined system. In a motor, the inductance is that portion of the internal impedance related to magnetic energy storage within the electrical machine as it is energized to deliver mechanical work. The electrical system driving the motor must deliver the energy to be stored in the inductor in addition to the energy for the mechanical work to be performed. This necessitates increases in the capacity of generators, wiring and transformers needed to supply the motor.

In alternators and generators the internal impedance is, perhaps, even more important. The alternator or generator impedance combines with the load impedance to determine the performance of the whole system. As the internal impedance of an alternator or generator is made to be a smaller fraction of the total impedance, the output voltage of the alternator or generator becomes a larger fraction of the ideal (pre-loss) voltage provided by the idealized source. In the current art care is generally taken to provide low resistance pathways in the copper windings of an alternator or a generator in order to minimize internal resistance and to minimize the power lost in the alternator or the generator and the waste heat that needs to be dissipated.

Another factor in the impedance of the alternator or generator is the inductance of the output windings. This inductance is a direct result of winding the output coils around magnetic pathways in the alternator or generator, this being the technique usually used to generate the output voltage. Any output current in such windings will store magnetic energy in the same magnetic pathways, as is well understood. The inductance, "L" of the circuit is related to this stored energy by the equation $$L = 2 * (\text{Energy Stored})/(\text{Current}^2)$$

The inductance of the output windings is part of the internal impedance and acts to filter the output voltage applied to the load. As frequencies get higher this inductive impedance blocks an increasing proportion of the ideal voltage provided by the alternator or generator and prevents it from acting on the load. While this has not been much of an issue for 60 Hz synchronous generators, it becomes a substantial design challenge for high frequency alternators. This has been known for some time; for example Griffing and Glockler present the design of a "High Frequency Low Inductance Generator" in U.S Pat. No. 3858071.

High frequency alternators or generators are desirable in that high levels of output power can be achieved with physically small magnetic paths, resulting in physically compact units. Claw pole alternators are typical of the physical design of high frequency generator devices and achieve high frequency by having a plurality of alternating poles. A disadvantage of these physically small claw pole units is that the close proximity of multiple poles and multiple magnetic pathways allows for unnecessary storage of substantial amounts of magnetic energy, resulting in high output inductance.

High output inductance causes several difficulties in the operation of high frequency alternators or generators. The impedance, Z of the inductor grows directly with the operating frequency ($\omega$, rad/sec) as shown in the following formula:

$$Z(\omega) = j * \omega * L \, (j = \text{imaginary operator})$$

The higher the frequency, the greater the impedance and filtering. To overcome this filtering, the ideal voltage must be increased as the frequency is increased. The ideal (pre-loss) voltage is usually increased by increasing the magnetic excitation level of the field, leading to higher magnetic intensity levels in the magnetic pathways. Since core losses due to eddy current generation are proportionate to both the frequency squared and the magnetic intensity level squared it will be understood that the need for extra excitation to overcome the inductive impedance of the output will lead to high core losses at high frequency operation. At the limit when the excitation levels reach the point where magnetic pathways become saturated, further .excitation is precluded, and the output of the device drops off with further increases in operating frequency.

As a counterpoint to this, if internal inductance were negligible, then the output voltage would rise with increasing frequency due to the increased change of flux with time. The excitation levels could then be reduced as the frequency increased, leading the device away from saturation. The reduction of core loss due to the decrease in excitation would offset the expected increase in core loss due to the increase in frequency such that the core losses would remain nearly constant with operating frequency.

It is therefore an objective of this invention to provide an electrical machine that may be used as a high frequency alternator with low output inductance.

Furthermore, high frequency alternators are often polyphased devices used with solid state circuits to rectify, switch, commutate or chop the output and reform it into DC or desired power frequency (50 or 60 Hz, etc) AC forms. In such devices individual alternator output phases are turned on and off at high frequencies, again invoking the filtering of the output inductance. Also, it is common for the output inductance of one phase to be linked by mutual inductance to the output of other phases so that the sudden change in current (switching) in one phase produces unwanted voltage transients in the other phases.

It is therefore a further objective of this invention to provide an electrical machine that may be used as a polyphase high frequency alternator with minimal adverse effects caused by mutual inductance between phases.

It is often desirable for the output voltage of a high frequency alternator to be controlled independently of its rotational speed. This is usually accomplished by the use of a field coil that allows an externally applied electrical current to control the level of magnetic excitation within the alternator. The field coil magnetic circuit provides a pathway for the storage of large amounts of magnetic energy and contributes to inductance of the output circuits.

It is well known in the art that small air gap lengths between the rotor and armature reduce the proportion of fringing effects of flux passing between the rotor poles and the armature circuit. Reducing the fringing effect of this flux is important for controlling the voltage waveform and efficiency of an electrical machine. Small air gaps also reduce the required field excitation level and the attendant energy losses as well as leakage flux levels. However, small air gaps increase the amount of magnetic energy which the output circuits store in the field coil magnetic circuit and thus increase the output inductance of the machine.

Permanent magnet generators and alternators avoid this problem of the field coil magnetic circuit contributing to the output circuit inductance because the magnets themselves are high reluctance elements and limit the magnetic energy that can be stored by the currents in the output circuits. However, permanent magnet machines do not provide for control of the output voltage independently of the rotational speed.

As noted for the typical high frequency alternators, such as the claw pole type, the close proximity of multiple poles and magnetic paths gives rise to the unnecessary storage of large amounts of magnetic energy. This is important in the field excitation circuit as well as the output circuit because of the saturation and core-loss issues already mentioned. It should be noted that the majority of magnetic energy is stored in the high reluctance air spaces that are interconnected by the low reluctance ferro-magnetic pathways in which the saturation and core-losses phenomenon occur. So called "leakage flux" passes through the air spaces to complete magnetic circuits without going through the intended pathways that link output coils. In physically compact machines where many poles and pathways are arranged in close proximity the leakage flux can become a high percentage of flux, making the machine inefficient.

It is therefore an objective of this present invention to provide a low inductance electrical machine with output voltage which can be controlled independently of the rotational speed, and with small air gaps between the rotor and the armature in order to promote efficiency and a minimum of fringing leakage flux.

Electrical machines based on armatures with poloidal windings around a stator shaped as an annular ring have long been know. Kirkley and Smith present a generator design based on radial air gaps in U.S. Pat. No. 4,087,711. Langley and Fisher disclose a DC motor based on this configuration in U.S. Pat. No. 4,547,713. Further improvements were presented by Radovsky in U.S. Pat. No. 5,798,594 in which a brushless synchronous machine is presented with axial air gaps completing the magnetic circuit through an annular ring stator in a fashion that greatly limits the leakage flux from the field. The rotors in these designs are relatively complex, present difficulties in establishment of air gap clearances, and do not address the issues of output inductance or mutual inductance between phases.

It is therefore a further objective of this invention to provide a low inductance electric machine which may be used as a brushless alternator with low leakage of the field flux combined with simplified rotor construction and provision for independently establishing multiple air gaps.

Recent work by Groehl, disclosed in U.S. Pat. No. 5,565,836, presents methods for achieving the nullification of unnecessary components of flux within a toroidally wound inductor by use of concentric windings around the arcuate axis of the toroid combined with electrical connection of such windings so that currents of equal magnitude and opposite direction provide flux cancellation. The cancellation of internal flux fields within a toroid or annular ring can be used to create low inductance, and is fundamental to the design and operation of the common electrical power transformer. It is therefore a further objective of this invention to provide an electrical machine wherein the benefits of flux cancellation within an annular ring, or other closed shape, can be combined with arrangements for the efficient transformation between mechanical and electrical energy.

The previously mentioned high frequency alternators may be used for the production of (low) power frequency (60 Hz) AC power through methods disclosed by Hilgendorf in U.S. Pat. No. 3,916,284 and improvements presented by Tupper in U.S. Pat. No. 6,051,959, "Apparatus for Resonant Excitation of High Frequency Alternator Field". In this use the field excitation of the high frequency alternator is subjected to 60 Hz amplitude modulation. This leads to 60 Hz fluctuations of the magnetic field throughout the alternator's magnetic core, with attendant possibilities for eddy current core losses. Many traditional alternators are designed for essentially constant levels of magnetic excitation. These traditional alternators typically use core structures, such as solid iron rotors, that are not optimized to reduce eddy current losses. For constant levels of excitation this is acceptable, as there is little change in field excitation and therefore little core loss. These traditional alternators are not suited to use with 60 Hz amplitude modulation of the field; the core losses due to field modulation would be too large.

It is therefore a further objective of this invention to provide an electrical machine wherein the field excitation may be amplitude modulated at power frequencies while core losses are minimized.

As is well known, many electromechanical devices can be run in either a motor or generator mode. A generator with low internal inductance might also be operated as a motor with low internal inductance. In motor operation, low internal inductance reduces the requirements for the electric supply system to handle energy that is stored in the magnetic field of the device. Furthermore high armature inductance can impede the rapid change of armature pole currents and magnetic fields, thereby restricting the high frequency response of the motor. A motor with low armature inductance would allow relatively high frequency operation of the motor, which is useful in variable speed applications.

It is therefore a further objective of this invention to provide an electric machine that may be used as a motor with low inductance of the armature circuits.

In stepper motor operations precise control of the shaft position is achieved through the creation of a discrete step relationship between rotor pole position and armature excitation. This is useful for many industrial applications requiring careful control of shaft position. It is therefore a further objective of this invention to provide for an electrical machine with low armature inductance and which may be operated like a stepper motor.

In contrast to the stepper motor operations, during synchronous motor operations it is desirable to achieve a smooth rotation of the shaft. It is an additional objective of this invention to provide a low inductance electric machine that may be used as a synchronous motor with smooth rotation of the shaft.

Where motors are used in systems with requirements for regenerative braking it is desirable to be able to control the regenerated voltage and current independently from shaft RPM. For example, an electrically powered automobile using regenerative braking to stop at a traffic light would need to control the generated power so that it was constantly suitable for recharging the vehicle battery even as the vehicle slows to a stop.

The rotor inertia of a motor represents an energy storage mechanism on the mechanical side of motor operation. Particularly for control situations, such as with stepper motors, it is desirable to minimize mechanical inertia in the motor. It is therefore an additional objective of this invention to select features that reduce the mechanical inertia of the rotor.

SUMMARY OF THE INVENTION

The objects set forth above as well as further and other objects and advantages of the present invention are achieved by embodiments of the invention described below. The present invention includes a rotor and a stator. A shaft that may be made of non-magnetic material and provides means to couple the device to an external source or rotary power on an external rotary load. The stator includes armature windings and an armature structure made of laminated electrical or magnetic steel or other suitable magnetic material with low core loss characteristics in order to minimize eddy current losses and hysteresis losses in the stator. A field coil of insulated copper or other suitable material wound as an annular ring is located coaxial with and inside the stator and provides means for an external current to excite and control magnetic fields within the device. One or more inner annular rings of low loss magnetic material are located coaxial with and inside the field coil. The field coil and the inner rings may be attached to either the rotor or the stator and provided with clearances to allow rotation between the rotor and the stator. A rotor assembly includes two rotor disks, which may be generally made of non-magnetic and low-conductivity materials, each holding the same number of rotor pole bars which are evenly spaced in a circumferential direction. These rotor pole bars are made entirely of laminated electrical or magnetic steel or other suitable magnetic material with low core loss characteristics in order to minimize eddy current losses and hysteresis losses. The rotor disks are independently located along the axis of the shaft such that air gaps of the desired lengths are established between the rotor pole bars and the stator. The two rotor disks are angularly offset from each other by a distance of one pole spacing, which distance is the same as one half of the circumferential pitch of the rotor pole bars on one disk, so that the rotor pole bar and air gap adjacent to the outer stator ring alternates from one disk to the other as one progresses around the circumference of the outer stator ring. The rotor pole bars can be magnetized to create rotor poles to carry excitation flux induced by current in the field coil. Armature coils are provided for one or more phases. Armature coils of each phase are wound in complementary pairs spaced evenly around periphery of the stator, each member of the complementary pair being wound in opposite direction and connected in series such that the magnetic fields induced by a current in the windings would be of equal magnitude but opposite sense in each winding and thus cancel. There should be one pair of complementary windings for each phase for each pair of rotor pole bars. Winding for other phases should be arranged similarly, but angularly displaced around the circumference by an appropriate fraction of the pole spacing to effect the desired electrical phase relationships.

The present invention establishes a particular series magnetic pathway for magnetic flux induced by currents the field coil and armature windings. The flux path is axial and circumferential through the armature structure, then serially via an air gap to a first rotor pole on the first rotor disk, then serially through the first rotor pole bar, then serially through the inner annular rings and at least one additional magnetic gap associated with the inner rings, then serially through a second rotor pole bar on the second rotor disk, and finally via an air gap back to the armature structure to complete the magnetic circuit.

In alternator or generator operation mode the field coil is energized and the shaft and rotor are turned by external means such that the rotor pole bars concentrate the field excitation flux in a moving pattern along the circumference of the stator rings. The changing flux in the outer stator ring causes voltage to be induced in the armature coils.

In motor operation mode the armature windings are energized in controlled sequence and attract the rotor pole bars to preferred positions. The rotor pole bars themselves can be further magnetized by the current in the field coil in order to control the level of attraction between the armature windings and the rotor pole bars, and thus control the shaft and pullout torque.

Importantly, the magnetic pathway allows small air gaps between the rotor and the armature so that flux fringing and leakage effects will be minimized. At the same time, the serial pathway includes additional high reluctance portions, inner air gaps or magnetic gaps, which increase the reluctance of the magnetic circuit and reduce the inductance of the armature output circuits. Any one or more of the additional high-reluctance magnetic gaps may be filled with air or a solid non-magnetic material, or substantially evacuated. An external current applied to the field coil controls the magnetic excitation level within the device and allows output voltage to be controlled independently of the rotational speed of the device.

For a better understanding of the present invention, together with other and further objects thereof, reference is made to the accompanying drawings and detailed description and its scope will be pointed out in the appended claims.

BRIEF DESCRIPTION OF THE DRAWINGS

FIG. 2B shows a cross section of a first alternate embodiment with 3 series air gaps in the magnetic pathway.

FIG. 2C shows a cross section of a second alternate embodiment.

FIG. 3A shows a developed view along the circumference of the outer stator ring of the preferred embodiment FIG. 3B shows an alternate configuration of the armature windings in the preferred embodiment.

DETAILED DESCRIPTION OF PREFERRED EMBODIMENTS OF THE INVENTION

Figure 1:
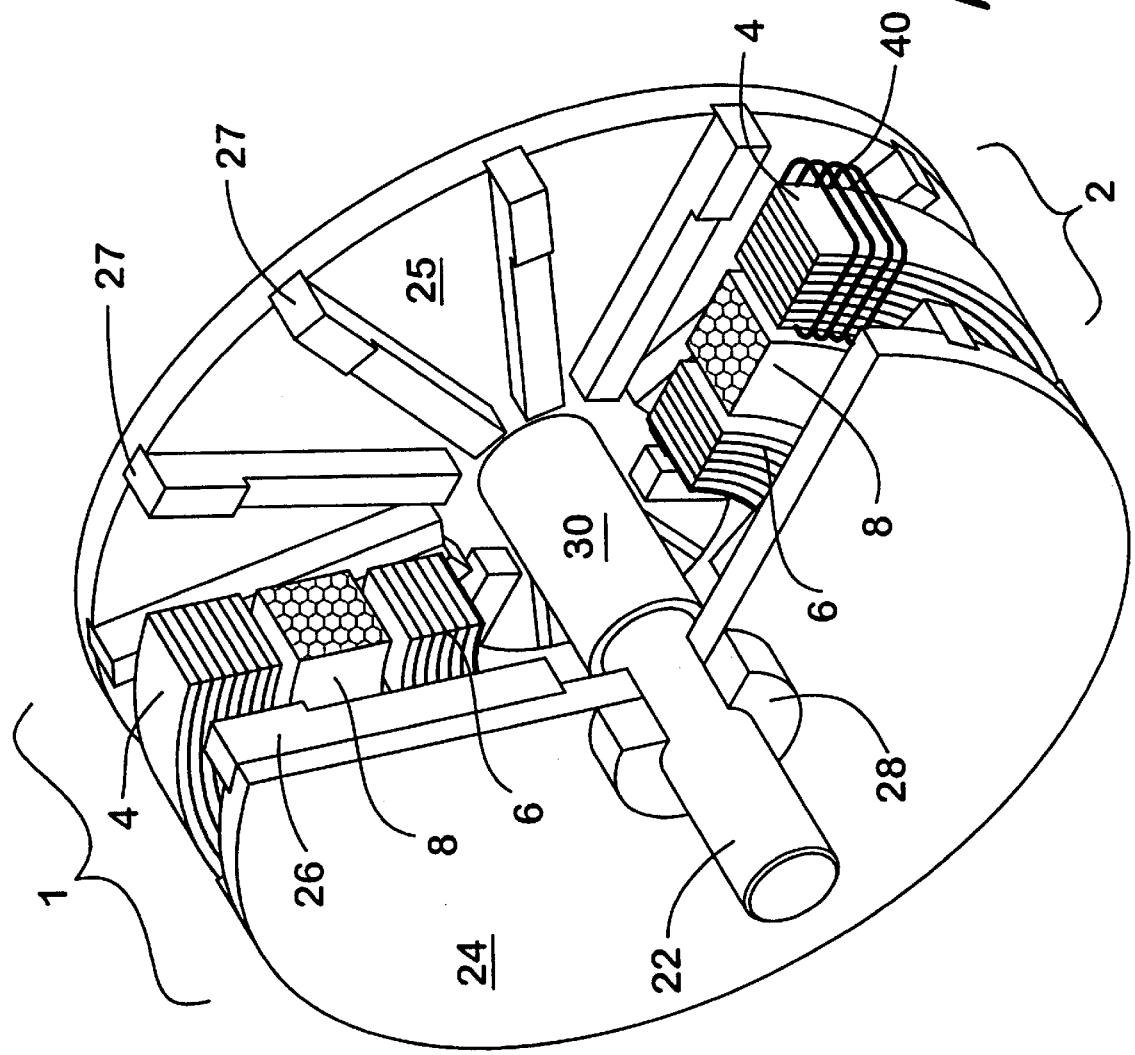
FIG. 1 shows a cut-away view of a preferred embodiment of the low inductance electrical machine of the present invention.

In a first embodiment, the low inductance electrical machine of the present invention is configured as a high frequency alternator. Referring to FIG. 1, the low output inductance electrical machine 1 of the present invention includes a stator assembly 2 including an outer annular ring 4 and an inner annular ring 6, both made substantially of laminated electrical or magnetic steel or other suitable magnetic material with low core loss characteristics in order to minimize eddy current losses and hysteresis losses in the stator, and in this embodiment manufactured by making a spiral winding of appropriate material. An annular field coil winding 8 of insulated copper wire or other suitable conductor is located coaxially between the two stator rings 4 and 6, and provides means by which the stator and rotor may be excited by an external current source. Armature windings 40 are wound poloidally around sections of the outer stator ring 4 in a specific manner that will be detailed later. The outer annular ring 4, in conjunction with the armature windings 40, acts as armature for this device. All of these stator elements, 4, 6, 8, and 40 are held together firmly and held stationary. The stator elements 4, 6, 8, and 40 may be glued together with materials like epoxy or secured by mechanical means such as radial pins and held stationary by attachment to an external housing.

The low output inductance electrical machine 1 also includes a rotor assembly which includes a common shaft 22, which may preferably be made of non-magnetic material, and two rotor disks 24 and 25, which may preferably be made of non-magnetic and poorly conducting material, each rotor disk also having secured to it an identical number of rotor pole bars 26 and 27 oriented radially and made entirely of laminated electrical or magnetic steel or other suitable magnetic material with low core loss characteristics in order to minimize eddy current losses and hysteresis losses in the rotor pole bars. The rotor assembly may also include an optional axial spacer 30 that may be made of non-magnetic material and which serves to maintain the axial spacing of the two rotor disks 24 and 25. The rotor is also fitted with means 28 to fix the rotor disks 24 and 25 to the shaft to maintain the axial and rotary positions of the disks.

Figure 2A:
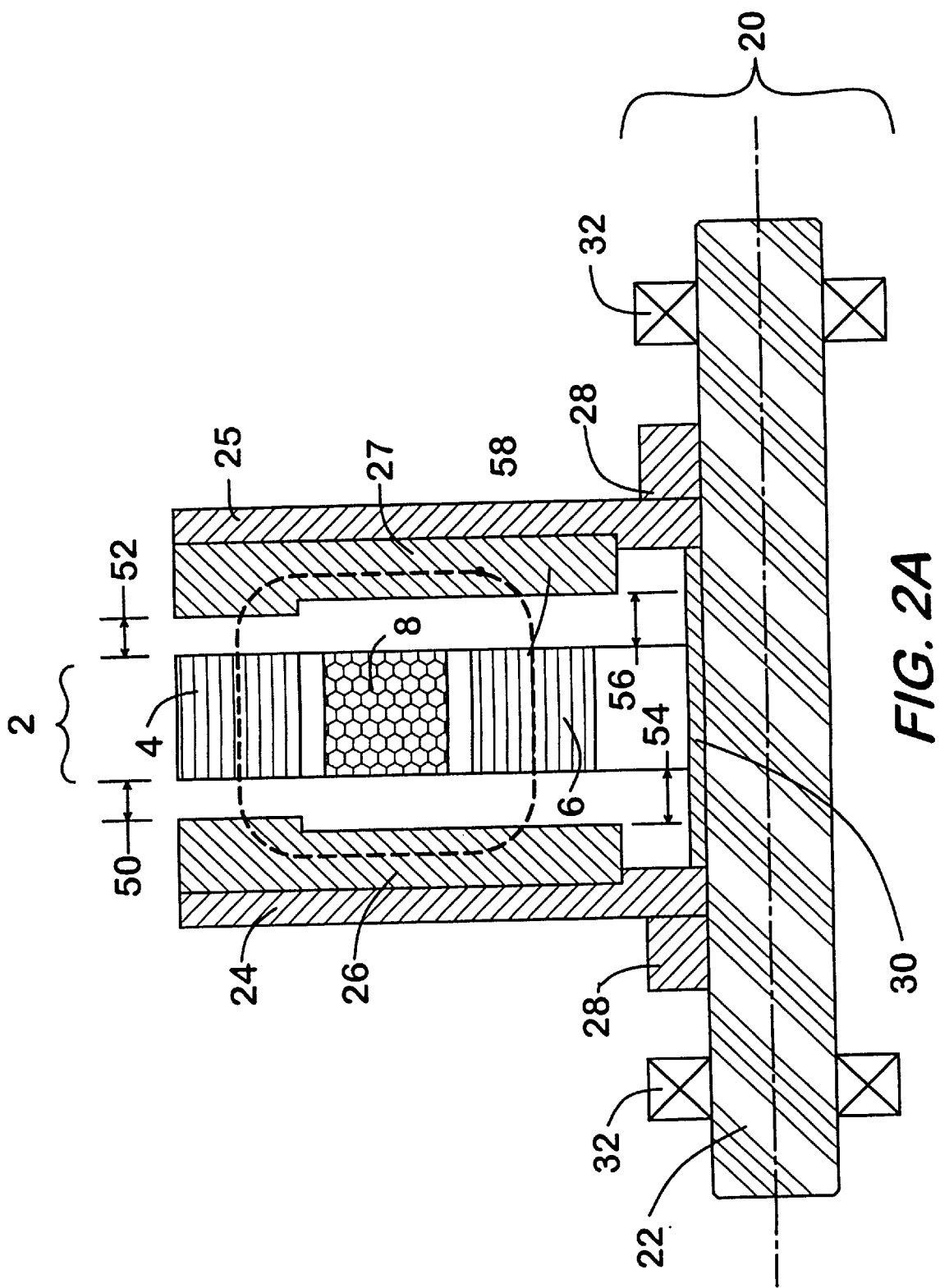
FIG. 2A shows a cross-section of the preferred embodiment of the low inductance electrical machine of the present invention.

FIG. 2A shows a cross section of the alternator. Means 32, such as bearings, are provided to maintain the axial and radial position of the rotor assembly 20 relative to the stator assembly 2 when shaft 22 is rotated relative to the stator assembly 2. FIG. 2A also shows the axial components of the magnetic path 58 through the stator assembly 2 and rotor pole bars 26 and 27. The amount of flux flowing in magnetic path 58 is controlled by the excitation of the field coil 8 and the magnetic reluctance of the path which in turn is primarily controlled by the reluctance of the two axial air gaps 54 and 56 between the rotor pole bars 26 and 27 and the corresponding faces of the inner stator ring 6 and the reluctance of the two axial air gaps 50, 52 between the rotor pole bars 26 and 27 and the corresponding faces of the outer stator ring 4. More generally, these air gaps 50, 52, 54 and 56 are high reluctance portions of magnetic path 58 and may be referred to as magnetic gaps. As shown in FIG. 2A, inner air gaps (54 and 56) may be of a different axial lengths than outer air gaps (50 and 52.) Designs with only two air gaps near the stator, similar to air gaps 50 and 52, present a more usual configuration for a magnetic path. Adding the two additional air gaps, 54 and 56 in series in the magnetic path 58 increases the excitation needed in the field coil but provides the following benefits:

(a) The added reluctance of air gaps 54 and 56 reduces the reaction flux that flows in magnetic path 58 when excited by the output current in the armature windings. This reduced reaction flux flow in the field magnetic path reduces the magnetic energy stored in this path resulting from the output current and thus is one important step in reducing the inductance of the output circuits of this device.

(b) The dimensions of outer air gaps 50 and 52 control the pattern of air gap flux between the outer stator ring 4 and the rotor bars 26 and 27. As the axial lengths of outer air gaps 50 and 52 are increased the pattern of leakage flux spreads further along the circumference of outer ring 4, bypassing the intended pathway through the armature coils and detracting from the performance of the machine. It is beneficial to be able to increase the reluctance of the magnetic pathway 58 in order to reduce the output inductance of the machine; at the same time it is desirable to maintain the small axial lengths of outer air gaps 50 and 52 in order to minimize leakage flux. The introduction of inner air gaps 54 and 56 allows the reluctance of the magnetic pathway 58 to be adjusted without changing the axial lengths of the outer air gaps 50 and 52. This provides for a new degree of independence between the level of leakage flux and the armature inductance.

(c) As is well understood, in the absence of an air gap, flux flow tends to concentrate on the inner edges of corners in a magnetic pathway, thereby creating localized areas of increased flux intensity; such areas are prone to magnetic saturation and higher core losses. The introduction of air gaps 54 and 56 forces the flux to spread out across the width of the air gap thereby utilizing the magnetic pathway more evenly, reducing localized concentrations, saturation, and core losses.

(d) For a typical two air gap machine, without the air gaps 54 and 56, the part that is the inner ring 6 of the stator of this invention would be replaced with a similar part attached to the rotor instead of to the stator. It would then be necessary to maintain a radial clearance between such a rotor part and field coil 8 so that it could rotate clear of interference with the stator. In this present invention the introduction of air gaps 54 and 56 allows inner ring 6 to be a fixed part of the stator, with no radial clearance requirements between itself and the field coil and with no requirements that the construction of inner ring 6 withstand the centrifugal forces from rotation.

(e) Construction is simplified relative to the present art in that the length of the air gaps can be controlled by spacer 30 which is outside the magnetic pathway. Adjustments to the air gaps and reluctance of the magnetic pathway can be achieved without modification of the laminated magnetic materials in the pathway.

(f) Construction is further simplified relative to the present art in that the shaft without rotor disks 24 and 25 can be inserted through the center of the stator assembly 2, and then disks 24 and 25 assembled into place over the ends of the shaft, independently positioned with optional assistance by means of spacer 30, and secured by fixing means 28 and bearing means 32.

(g) It can be appreciated from FIG. 2A that the shaft 22, spacer 30, rotor plates 24 and 25 are not essential components of the magnetic path and can be made of non-magnetic and poorly conducting materials in order to reduce core losses in these areas.

(h) The separation of the mass of the inner stator ring 6 from the rotor assembly 20 allows the rotor assembly to be relatively lightweight and have lower inertia compared with rotors in which the equivalent flux path, represented by inner stator ring 6, is included in the rotor.

It will be noted from FIG. 2A and other figures to follow that the arrangement of the magnetic path 58 in the alternator 1, wherein the outer stator ring 4, inner stator ring 6, field coil 8 are all stacked concentrically, and wherein the rotor pole bars 26 associated with rotor disk 24 all have the same magnetic polarity when the field coil 8 is energized, and wherein the rotor pole bars 27 associated with rotor disk 25 are all alike in having the opposite polarity, provides for a minimal amount of leakage flux due to field excitation. This leads to more optimal use of the magnetic material and lower core losses than designs with large amounts of leakage flux, such as in claw pole designs.

FIG. 2B shows a cross section of a first alternate embodiment with a magnetic pathway with three magnetic gaps in series, two outer air gaps 50 and 52, and one inner magnetic gap 55. The inner ring is now comprised of two parts, 7A and 7B which are rigidly attached to the rotor structure and are provided with radial clearance to allow rotation within the field coil 8 which is fixed to the stator. Inner magnetic gap 55 may be an air gap or a non-magnetic spacer held firmly between the parts 7A and 7B. It will be understood that gap 55 might be placed between the rotor bars, 26, and one of the inner ring parts, in which case parts 7A and 7B could be combined into a single part rigidly attached to the adjacent rotor bars 27 and rotor disk 25. This alternate embodiment achieves the advantages a, b, e, f and g as outlined above but does not realize advantages c, d and h outlined above for the preferred embodiment.

FIG. 2B also shows an outer casing 150 fixed to a frame of reference 152 by means 151 such as brackets and bolts. FIG. 2B also shows a source of rotary power 154, such as a windmill or vehicle engine, coupled to the shaft 22 by means 153 such as belts and pulleys. For operation of the current invention as a motor, element 154 could represent a rotary load, such as a fan blade or vehicle transmission.

FIG. 2C shows a second alternate embodiment in which rotor disks 24 and 25 are held apart by non-magnetic axial spacer elements 156 which are arranged at the outer radius of the rotor disks to rotate clear of the stator structure and to provide resistance to the magnetic forces of attraction between the rotor bars 26 and 27 and the outer annular ring 4. Elements 156 may be a single complete ring or a number of individual elements spaced around the circumference of the rotor disks. In this embodiment the rotor disks are allowed to rotate relative to the shaft by means of bearings 32 and the stator is fixed by means of a radial connector 9 to the shaft 22 which is in turn fixed to frame of reference 152. Rotary source of power 154 is coupled directly to the rotor disks.

While it is traditional for the stator and casing to be the fixed and for the shaft and rotor to turn, only the relative motion between the stator structure and the rotor structure is essential for operation of the device and either element may fixed relative to the frame of reference as long as the other turns.

In general the magnetic materials of the alternator would be laminated magnetic or electrical steels or other suitable magnetic material with low core loss characteristics in order to minimize eddy current losses and hysteresis. In order to utilize the low core loss properties of the laminated materials the flux should flow within the plane of each laminate or parallel to the curved surface of each laminate and not have components that flow perpendicular to the planes or surfaces of the laminates. Induced voltages and the resulting eddy currents are oriented around changing flux lines in a plane perpendicular to the flux lines. It is desirable that the laminations be perpendicular to the plane of eddy currents in order to have the inter-laminar resistance impede the circulation of eddy currents. It is undesirable for the lamination to be parallel to the plane of components of the eddy currents since such components would then circulate relatively unimpeded, causing large losses. FIGS. 1 and 2 show that the magnetic material laminates are all oriented such that the flux flows parallel to the surface of the laminates. The outer stator ring 4 and the inner stator ring 6 are preferably made of spiral windings of magnetic material, so that the laminates are essentially concentric with the axis of the shaft 22. Flux flow in these elements is axial and circumferential and parallel to the curved surfaces of the laminates. In situations where the level of field flux in magnetic path 58 may be amplitude modulated at a desired power frequency, care must be taken to prevent the layers of spiral wrappings of the inner stator ring 6 or outer stator ring 4 from shorting from one layer to another; such short circuits amount to creating a closed conductor enclosing axial components of magnetic flux in pathway 58. As is well known, there will be significant voltage and current induced into a closed conductor which encircles a time varying flux. Such currents are essentially eddy currents and waste power. The rotor pole bars 26 are made of laminations of magnetic material which are stacked in planes parallel to the plane containing the radial dimension through the center of the rotor pole bar 26 and the axis of the shaft 22. Similarly the rotor pole bars 27 are made of laminations of magnetic material which are stacked in planes parallel to the plane containing the radial dimension through the center of the rotor pole bar 27 and the axis of the shaft 22. The flux flow in the rotor pole bars 26 and 27 is essentially radial with slight axial components and this flow is fully within the plane of the laminates.

FIG. 3A shows a developed view along the circumference of the outer stator ring 4. In this invention, rotor disk 25 is shifted circumferentially one pole spacing 10 in relationship to rotor disk 24 so that rotor pole bars 26, 26A and rotor pole bars 27, 27A and their corresponding air gaps are staggered along the circumference of outer stator ring 4. Assuming that the field coil excitation is such that rotor pole bars 26 and 26A act as north poles and rotor pole bars 27 and 27A act as south poles, FIG. 3A shows a simplified schematic of the direction and distribution of field induced flux elements 60, 62 along the circumference of stator ring 4. Essentially the flux from north pole bar 26 splits with half going clockwise as flux flow 60 and half going counter clockwise as flux flow 62, each to flow to the nearby south pole bars 27 and 27A. As the rotor pole bars 26, 26A, 27, 27A, etc, move relative to the circumference of outer stator ring 4 the field induced flux 60, 62 enclosed by any one armature winding, such as 40, will alternate in direction and this time variation in flux will induce voltage within the winding.

To take advantage of this flux alternation, armature winding 40 is positioned on the outer stator ring 4 and wound a given number of turns in one direction, and complementary armature winding 42 is placed one pole spacing 10 away along the circumference of the outer stator ring 4 and wound the same number of turns but in the opposite direction so that when the windings are connected in series at reference point 44 the voltages caused by the change in flux as the rotor pole bars 26, 26A and 27 and 27A move relative to the outer stator ring 4 will augment each other. It will be clear that reference point 44 need not be a termination of the winding, but may be a point at which the direction of a continuous winding reverses. Due to the spacing of the reversing pattern of flux induced by the field excitation, there should be one complementary pair of armature windings 40 and 42 for each pair of complementary rotor pole bars 26 and 27.

FIG. 3B shows an alternate configuration of the armature windings 40 and 42 placed on the outer stator ring 4 in complementary pairs and connected in series to show that the same effect of complementary pairs of armature windings can be achieved if windings 40 and 42 are wound in the same physical direction around outer stator ring 4 while the common connection point 44 is changed so that the load current "I" in armature winding 40 flows in a circumferential direction of reversed sense to the load current in armature winding 42.

In FIGS. 3A and 3B the complementary pairs of windings 40, 42 and 40A, 42A, etc., refer to a single-phase armature circuit. Complementary pairs of windings for additional output phases, as needed, may be placed on the outer stator ring 4, the position of each phase being offset along the circumference of the outer stator ring 4 by the appropriate fraction of the pole spacing to effect the desired electrical phase shift. Such additional phase windings can be wound directly over each other, as will be described later, or over separate segments of the outer stator ring 4. In each phase the spacing between complementary windings 40 and 42 should be one pole spacing 10. Due to the spacing of the reversing pattern of flux induced by the field excitation, there should be one complementary pair of armature windings 40 and 42 for each phase for each pair of complementary rotor pole bars 26 and 27.

Superimposed on the flux induced by the field excitation will be the flux induced by any load currents flowing in the armature coils. At flux intensity levels below the magnetic saturation threshold of the magnetic material the effects of these different flux fields may be analyzed separately and added together linearly. For electrical and magnetic steels that threshold is often near 1.2 to 1.5 Tesla. For clarity the rest of this description of the preferred embodiment follows the assumption that the device is operating within its linear range. However, it will be understood that where the flux intensity level of superposed flux fields exceeds the saturation threshold of the magnetic material the magnetic response of the device will be non-linear. As with many electromechanical machines the present invention will still function in the non-linear range caused by magnetic saturation.

Figure 4B:
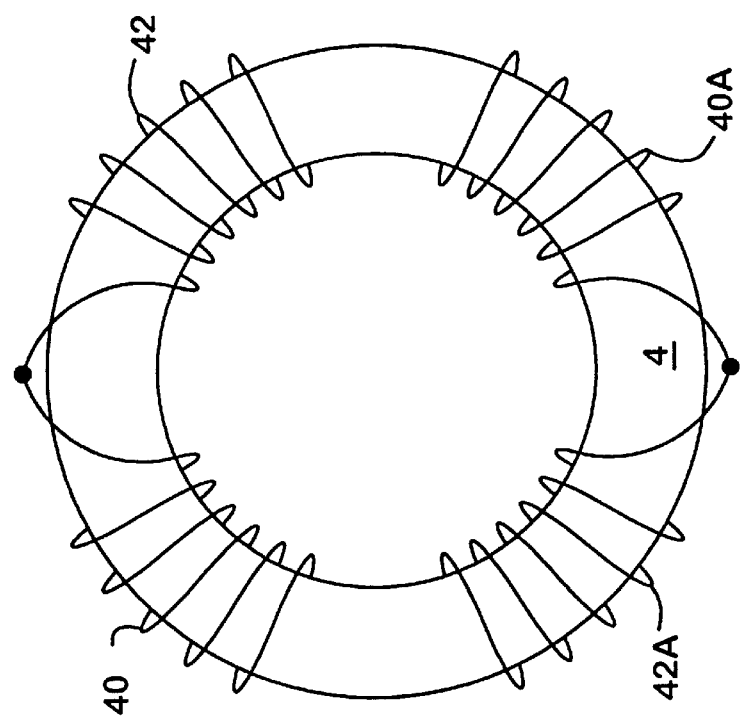
FIG. 4B is a schematic diagram of multiple pairs of complementary armature windings spaced around the circumference of the outer stator ring in the preferred embodiment.
Figure 4A:
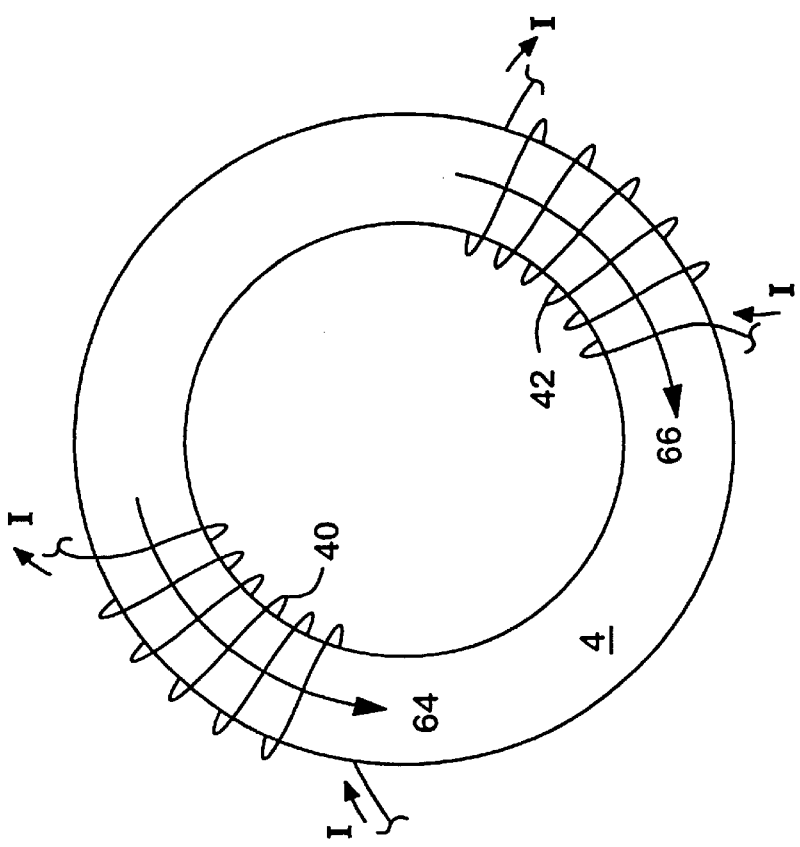
FIG. 4A is a schematic diagram of the magnetic pathways through the outer stator ring and the direction of flux flow generated by load current in a pair of complementary armature windings in the preferred embodiment.

In FIG. 4A the load current in the armature pole winding 40 and the current in armature pole winding 42 will be of equal magnitude, and will induce flux flows 64 and 66 of equal magnitude, but flowing in opposite circumferential directions completely around the low reluctance material of the outer stator ring 4. These equal but opposite flux flows, 64 and 66 superimpose and effectively cancel the inductive effects of this magnetic circuit relative to the armature current.

While the superposition of the equal but opposite flux flows may be referred to as flux cancellation, in actual fact the two coils will still be linked by mutual inductance. A reactance voltage of one volt in coil 40 will produce a reactance voltage of one volt in complementary armature coil 42. By their complementary series electrical connection the net reactance voltage will be zero volts. This makes the armature circuit behave as a small value inductor (theoretically zero).

Complementary pairs of armature poles 40 and 42 are needed for this effective cancellation of circumferential flux flows 64 and 66. The resultant flux intensity level (B field in Tesla) in the circumferential direction within the outer stator ring 4 will be very low (theoretically zero) as a result of this cancellation (superposition) effect. The low resultant (net) flux intensity level will allow the outer ring 4 to carry the reaction flux from high load currents without going into magnetic saturation. Eddy current and hysteresis losses (core losses) in the outer ring 4 will be proportionate to the square of the low (net) flux intensity, and thus will be very low. The resultant output inductance due to flux flowing circumferentially all the way around the low reluctance path of the outer stator ring 4 will be very low (theoretically zero). In contrast, without the cancellation effect of the flux induced by load current in complementary armature winding 42, the flux intensity level, the tendency toward magnetic saturation, and the core losses in outer ring 4 due to load current in armature winding 40 would all be substantial and contrary to the objectives of this invention.

The advantages of low inductance, low flux intensity levels with low tendency toward magnetic saturation, and low core losses are obtained at each location within the magnetic circuits where the fluxes superimpose to effectively cancel. The advantages are proportionate to the amount of effective cancellation except for core losses that are related to the net flux intensity level squared.

It will be further appreciated from FIG. 4B that additional complementary pairs of armature windings 40*a* and 42*a* can be placed on the outer stator ring 4, members of the pairs spaced one pole spacing apart and that each complementary pair will have a net effect of zero inductance on itself and a mutual inductance of zero on any similar complementary pairs located around the circumference of outer stator ring 4. In turn, it follows that the mutual inductance of a series of complementary pairs of armature windings and the mutual inductance between phases made of such pairs due to circumferential flux flows 64 and 66, taken together, will be (theoretically) zero.

It must be emphasized that without the arrangement of complementary pairs 40 and 42 high levels of net flux would flow around the circumference of the outer stator ring 4 due to the low reluctance of ring 4. This would result in high levels of magnetic intensity in the magnetic material, and saturation at relatively low levels of output current. In this undesirable arrangement the output inductance of the alternator would be very high and the mutual inductance of the various output phases would be very high. It will also be appreciated that the outer stator ring 4 could be a closed shape other than a toroid and still manifest the properties of cancellation of flux due to complementary pairs of armature coils 40 and 42.

Figure 5:
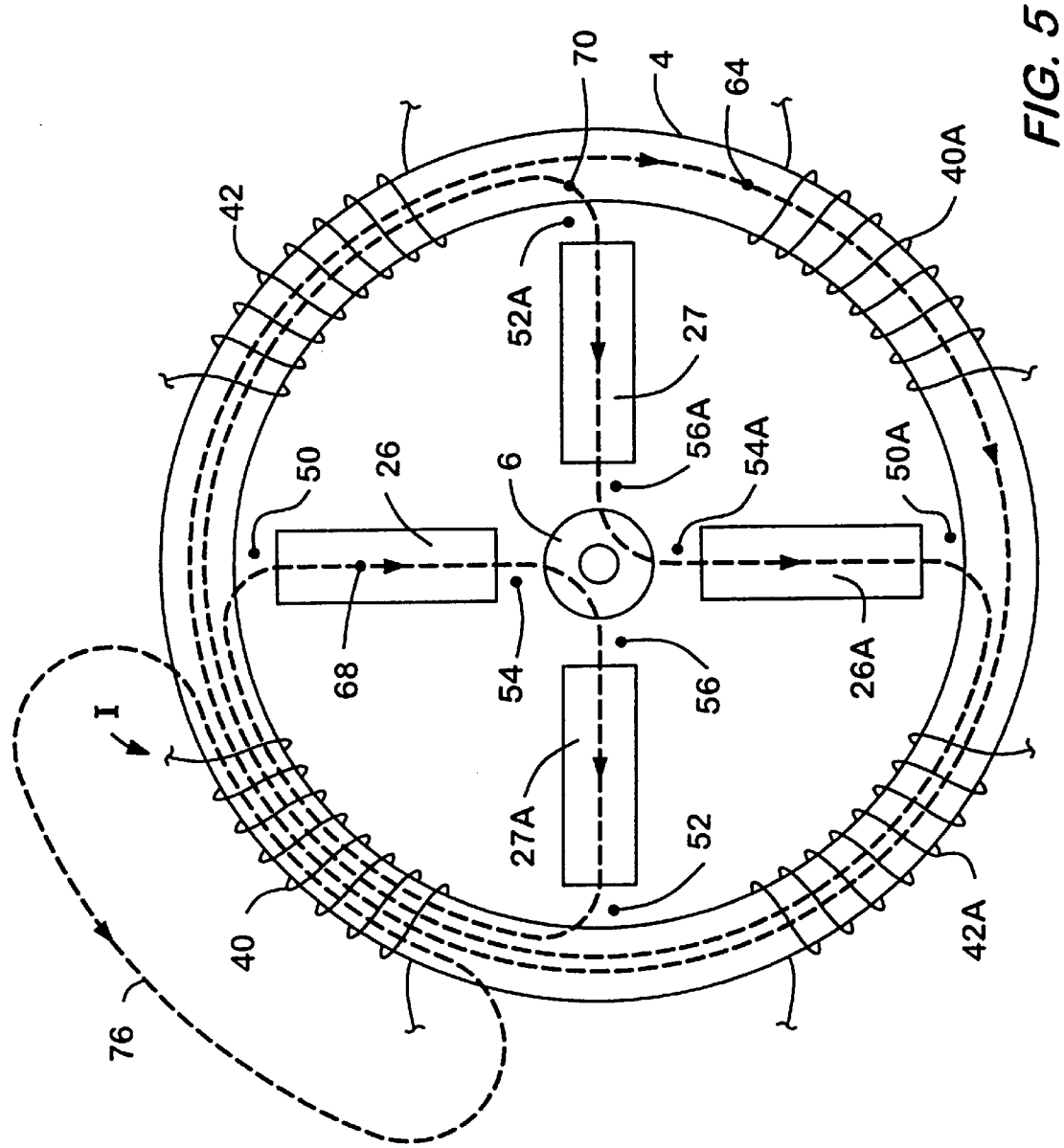
FIG. 5 is a schematic diagram of the magnetic pathways through the rotor and the direction of flux flow induced by load current in a poloidal armature winding in the preferred embodiment.

FIG. 5 presents a schematic of the multiple flux paths excited by current in armature winding 40. It can be seen that in addition to circumferential flux flow 64, discussed above, there is other flux induced by the current in armature coil 40 and this flux does not complete the entire circuit through the low reluctance material of outer stator ring 4 but will complete a parallel circuit through a higher reluctance pathway including the air gaps and the rotor (load induced rotor flux, see flux flow 68 and 70), or locally through the air near the coil 40 (local flux, see flux flow 76). Additional design considerations, explained below, will minimize the inductive effect of these alternate flux paths.

In FIG. 5, load induced rotor flux flows 68 and 70 show the magnetic pathways in the rotor taken by flux induced by load current in armature winding 40. Magnetic energy is stored along these flux paths, particularly in the high reluctance air gap areas. This energy storage would manifest as self inductance in armature winding 40. Also since a portion of this flux flows through armature windings 42 and through armature windings from other phases there will be mutual inductances between armature winding 40 and other armature windings.

Figure 6:
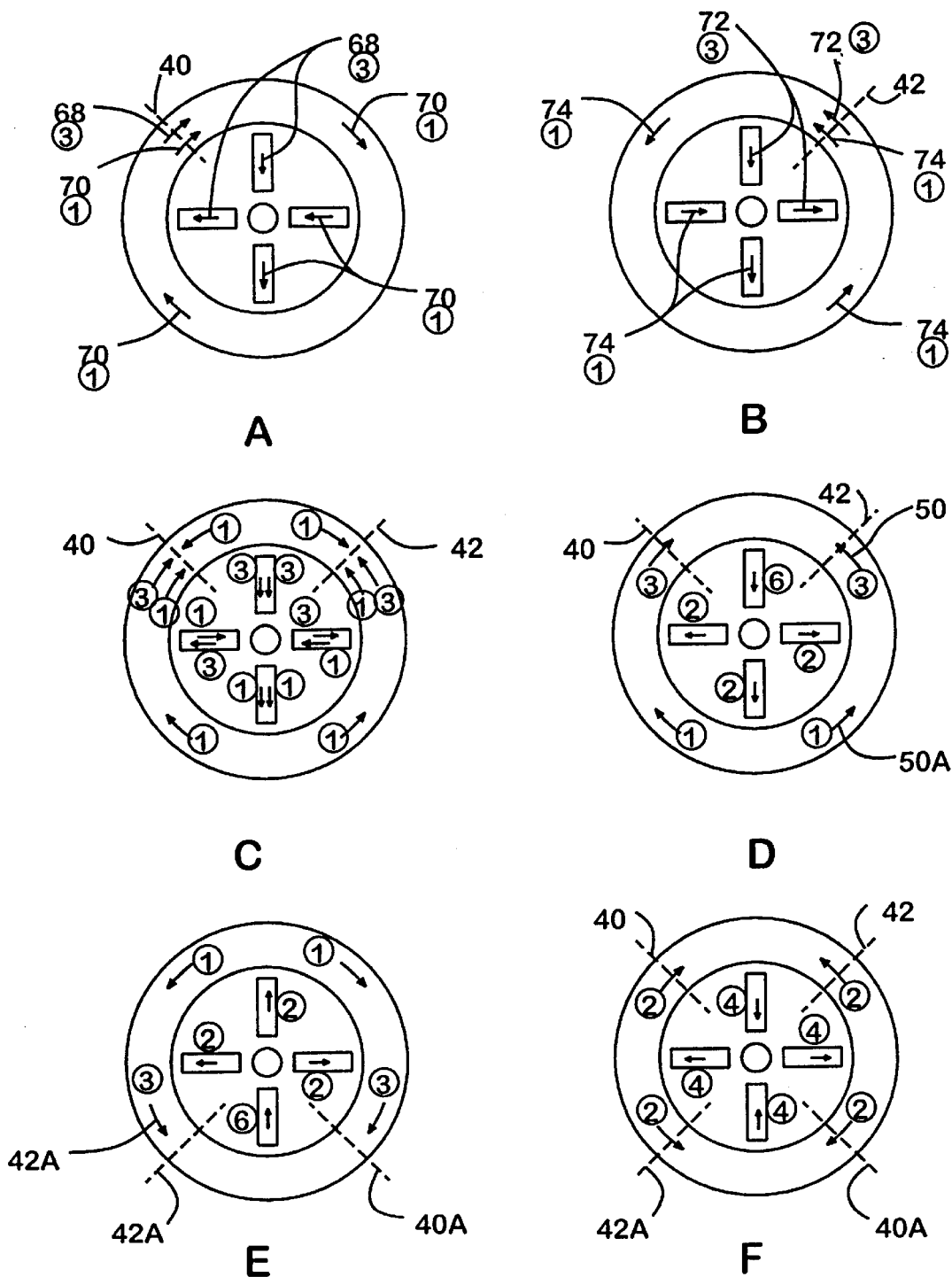
FIG. 6 includes FIGS. 6A–6F that show a scheme for analyzing the mutual inductance of rotor flux flows using various configurations of poloidally wound armature coils in the preferred embodiment.

FIGS. 6A–F shows a schematic for analyzing the self and mutual inductance of rotor flux flows using various configurations of armature coils. The numbers in circles refer to the relative flux intensity levels represented by the associated arrows; the flux intensity values are based on similar amp-turns of excitation from load current in each coil. FIG. 6A shows the components of flux in each branch of the flux flow path for rotor flux flows 68 and 70 induced by the load current in armature coil 40. (Note that circumferential flux flow 64, discussed above, is not shown in FIGS. 6A–6F.) Note that the relative flux intensity at coil 40 is "4". FIG. 6B shows a similar analysis for flux flows 72 and 74 induced by the load current flowing through complementary armature winding 42, note the change in direction of flux flow due to the reversed winding direction of armature winding 42.

FIG. 6C shows the flux flows, 68 and 70, superimposed onto flux flows 72 and 74. FIG. 6D shows the net flux flow; flows in opposite directions tend to "cancel" the effect of each other. It can be seen that the induced rotor path flux caused by equal currents in the complementary pair of armature windings 40 and 42 do not fully cancel but will have a net inductance and a high flux intensity level in some of the air gaps, in some sections of the outer stator ring 4 and in some of the rotor pole bars. Note, however, that the relative flux intensity at coils 40 and 42 are now reduced to a net of "3."

FIG. 6E shows the net flux caused by a second complementary pair of armature windings 40A and 42A placed diametrically on the outer stator ring 4 from armature windings 40 and 42. (Confer with FIG. 4B.) Note that these net fluxes are the reverse of those in FIG. 6D. FIG. 6F shows the net flux flows induced by equal currents in the two pairs of complementary armature windings 40 and 42, and 40A and 42A. It will be seen that, after superposition, the relative flux intensity level at coil 40, etc. has been reduced to "2." This means that the mutual inductances of these four armature winding coils 40, 42, 40A and 42A will combine to reduce the net inductive effect from induced rotor-path flux. It is understood that the typical addition of four series coils of equal turns on a common magnetic pathway leads to mutual inductances that combine to create a total inductance of (4 squared) 16 times the inductance of a single coil. Here, however, the arrangement of complementary pairs of windings, one pair of windings per pair of rotor pole bars, results in a substantial cancellation of inductive effects. In the case shown the four windings combine to reduce the net flux in each winding to one half of its own self inductance flux; the total series inductance of the four windings is only twice that of a single winding.

The inventors have discovered that this condition of the effective cancellation of inductance for induced rotor-path flux holds for any case where there is one complementary pair of armature windings, members of the pair spaced along the circumference of the outer stator ring 4 at one pole spacing 10, for each pair of rotor pole bars. The inventors have also discovered that the total series induction of the output rises arithmetically with the number of winding pairs; that is the inductance of seven complementary winding pairs spaced around seven rotor pole pairs is seven times the inductance of one winding pair spaced around a single rotor pole pair.

For purposes of clarity, FIGS. 5 and 6A–6F have been laid out so that the rotor pole bars 26, 26A, 27 and 27A and their associated air gaps are shown stacked radially inside the outer stator ring 4. This is similar to the position of rotor poles in a claw pole type alternator and the analysis given here could apply to poloidally wound alternators with claw pole rotors as well as to alternators with the rotor structure shown in FIGS. 1 and 2A and 2B. Furthermore, while FIGS. 5 and 6A–6F show the four air gap configuration of this invention, the conclusions of the analysis would not be altered by the elimination of air gaps 54, 54A, 56 and 56A, etc., as in the more usual two air gap design.

Figure 7:
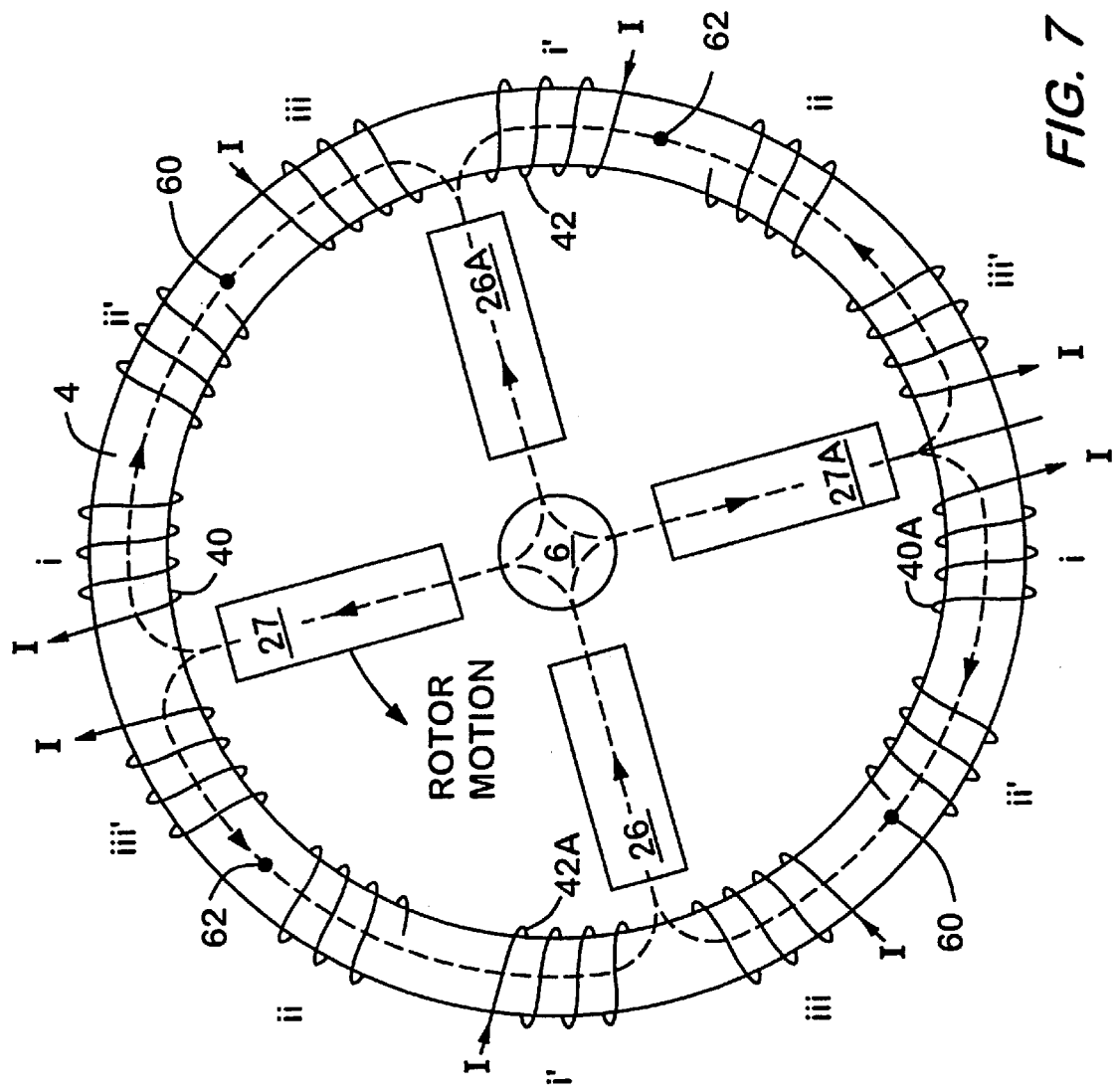
FIG. 7 shows one method of winding three phases around the outer stator ring in the preferred embodiment.

There will also remain the effect of local flux 76 of FIG. 5 for each armature winding resulting in additional self inductance of the output. Because of the long, high reluctance, air return path of the local flux 76, the flux flow 76 will be low compared to the flux levels carried in the low reluctance magnetic materials. It must also be noted that local flux 76 may link with other near by armature windings and result in some net mutual inductance. It will be appreciated that these net inductances will be small compared to the output inductance that would be developed without cancellation. The net result will be low output inductance for this alternator, coupled with low core losses and capability to handle large load currents without saturation of the magnetic material or pathways.FIG. 7 shows one method of winding three phases around the outer stator ring 4. A single phase is shown as two sub-phases (i, i') where elements 40, 40A, etc., wound in one direction, constitute sub-phase i and the complementary elements 42, 42A, etc., wound in the opposite direction, constitute sub-phase i'. A second phase contains two similar sub-phases ii and ii'. A third phase also contains two sub-phases iii and iii'. In this figure the coils of each armature winding are concentrated along a discrete section of the circumference of outer stator ring 4. Adjacent windings take the order shown in FIG. 7 (i, ii', iii, i', ii, iii', i . . . ), with each winding being of opposite directional sense to its nearest neighbors. Due to the concentrated nature of each coil the instantaneous field flux is nearly the same through all turns of any one armature winding; this results in high voltages as the flux changes due to rotor motion.

Figure 8:
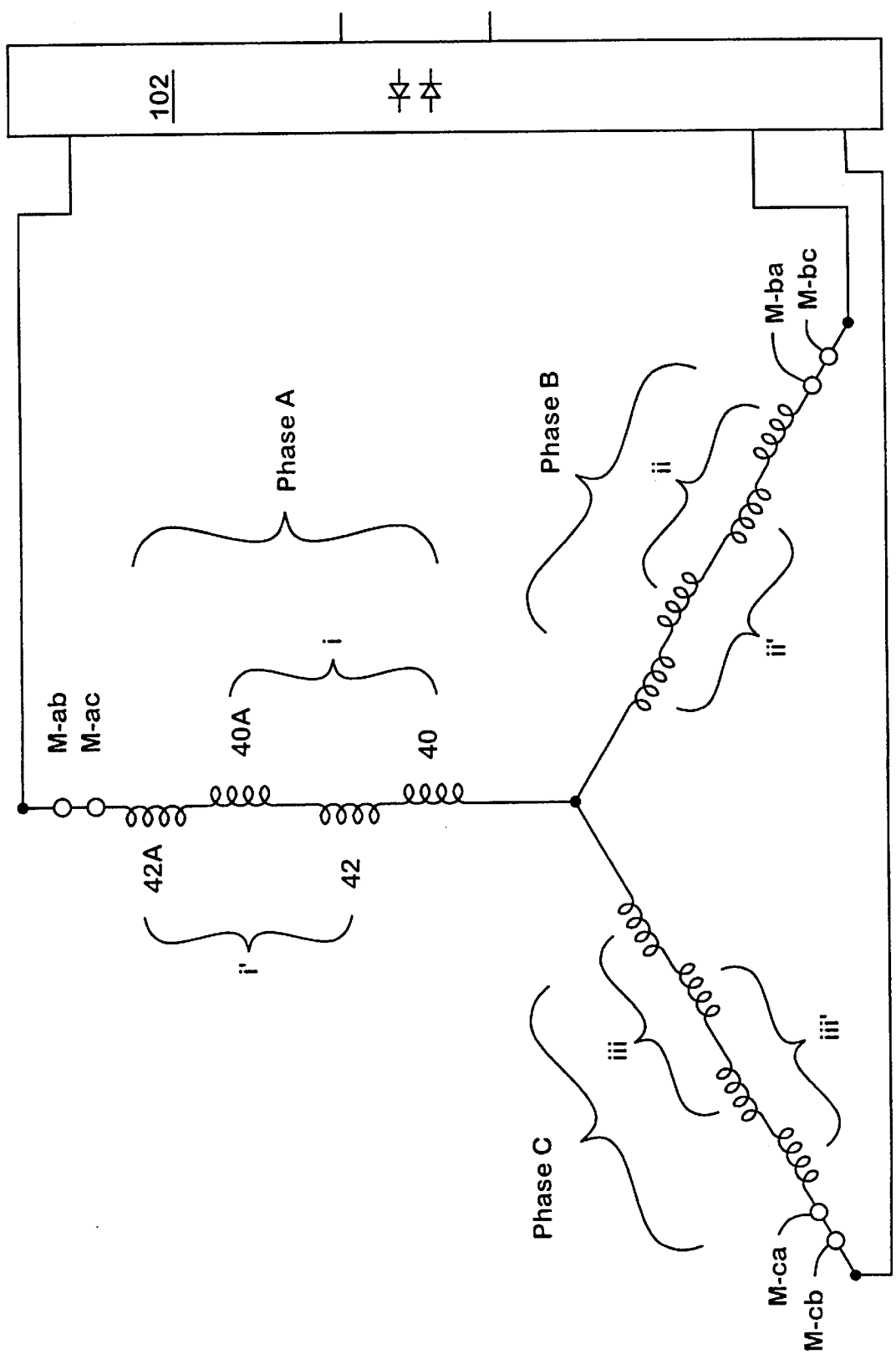
FIG. 8 is a schematic diagram of one method of connecting a multiphase alternator winding to an external rectifier in the preferred embodiment of the present invention.

FIG. 8 shows an electrical schematic of the three phase alternator windings. The complementary pairs of armature windings 40, 42 and 40A, 42A are connected in series to form sub-phase-i and sub-phase-i' which together form phase A. Phases B and C are formed in similar fashion. As shown, the circuit is further impacted by M-ab and M-ac, the mutual inductances of flux from armature currents in phases B and C, respectively, acting on the windings of phase A. It will be understood that it is important to minimize these effects and the resultant output inductance. FIG. 8 also shows an optional external rectifier circuit 102, which may be used to produce a rectified output in conjunction with the high frequency alternator configuration of this invention in a manner well understood in the art. Although the windings of the three phases in FIG. 8 are shown as being connected in the common "wye" configuration, it will be understood that the advantages of the present invention can be applied equally well to the familiar "delta" configuration.

The low inductance output of the configuration of this invention is valid for single and multiphase alternators, regardless of the type of load.

For use in high frequency alternators in which the multiphase voltage output will be further rectified or switched by solid state means to create DC or controlled frequency AC power, further low inductance embodiments are possible.

For the particular case of the present invention used as a three phase alternator wye-connected to an external rectifier circuit 102 the mutual inductances between phases tend to cancel. By reference to FIGS. 7 and 8 it will be understood that, for the position shown, the armature coils of phase A (i/i') and phase C (iii/iii') are in regions where the field induced flux elements 60 and 62 are changing rapidly as the rotor pole bars 26, 27 move. The rapid change in flux will induce high voltage within phases A (i/i') and C (iii/iii'). It will be understood by those skilled in the art that, for a rectified three phase wye-connected system, the armature coils of phases A (i/i') and C (iii/iii') will be conducting with the same (series) current "I" as shown. During this time phase B (ii/ii') is in an area of peak (slowly changing) field induced flux, will have low voltage, and due to the effect of the rectification will conduct no current. It will also be understood that the direction of the induced current "I" in coils of sub-phases i' and iii', as shown in FIG. 7, will each produce reaction flux traveling in opposite directions through the stator ring 4; these equal and opposite fluxes therefore effectively cancel. This also produces a situation in which the net effective flux flowing through the rotor is zero. Thus, there is no inductive effect of current flowing through the rectified armature phases, except for inductance due to the local leakage flux 76 of each winding. As before, for this cited reduction in the mutual inductance between phases, there must still be one complementary pair of armature windings, members of the pair spaced along the circumference of the outer stator ring 4 at one pole spacing 10, for each pair of rotor pole bars for each phase.

Figure 9:
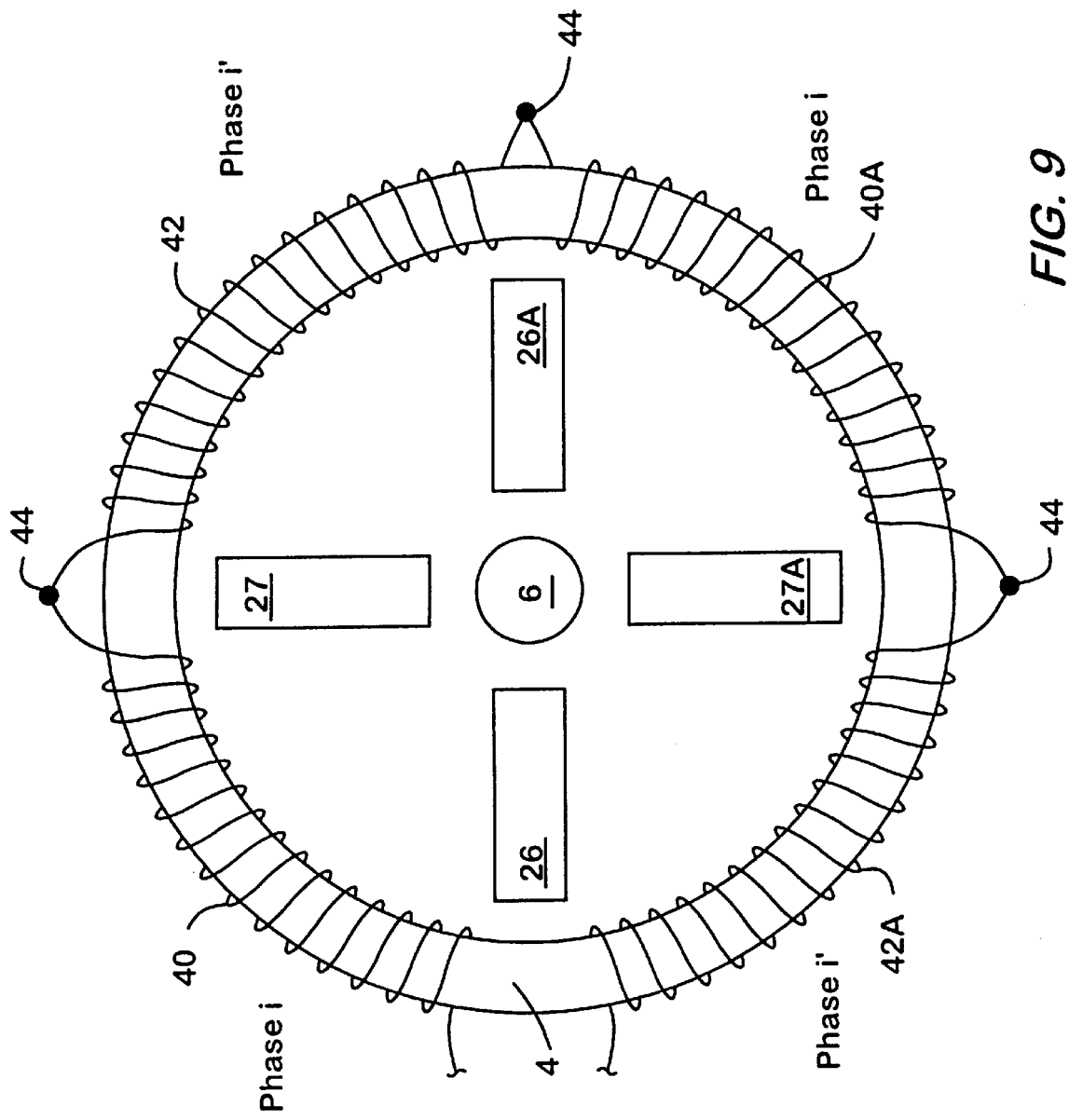
FIG. 9 shows an alternate method of winding one of several phases around the outer stator ring in the preferred embodiment.

FIG. 9 shows an alternate method of winding a single phase around the outer stator ring 4 in which the winding 40 (phase i) is spread out to occupy most of the circumference of the outer stator ring 4 for a distance equal to one pole pitch or pole spacing 10 (i.e. over most of the distance between rotor pole bars 26 to 27), and in which complementary winding 42 (phase i') is spread out to occupy most of the complementary circumference from rotor pole bar 27 to the next rotor pole bar 26A. This configuration reduces the local inductance of phase A to about half as compared to the configuration of FIG. 7 in which the windings 40 and 42 are concentrated in smaller arcs along the circumference of the outer stator ring 4. Phases B and C may be accommodated in this configuration by being wound over (coaxial with) phase A with the position of the winding reversals 44, 44A offset by one third of the pole spacing. More or fewer phases could be accommodated by appropriate adjustment of the phase offset. The mutual inductance between phases is also reduced by about half for this alternate configuration.

Figure 10:
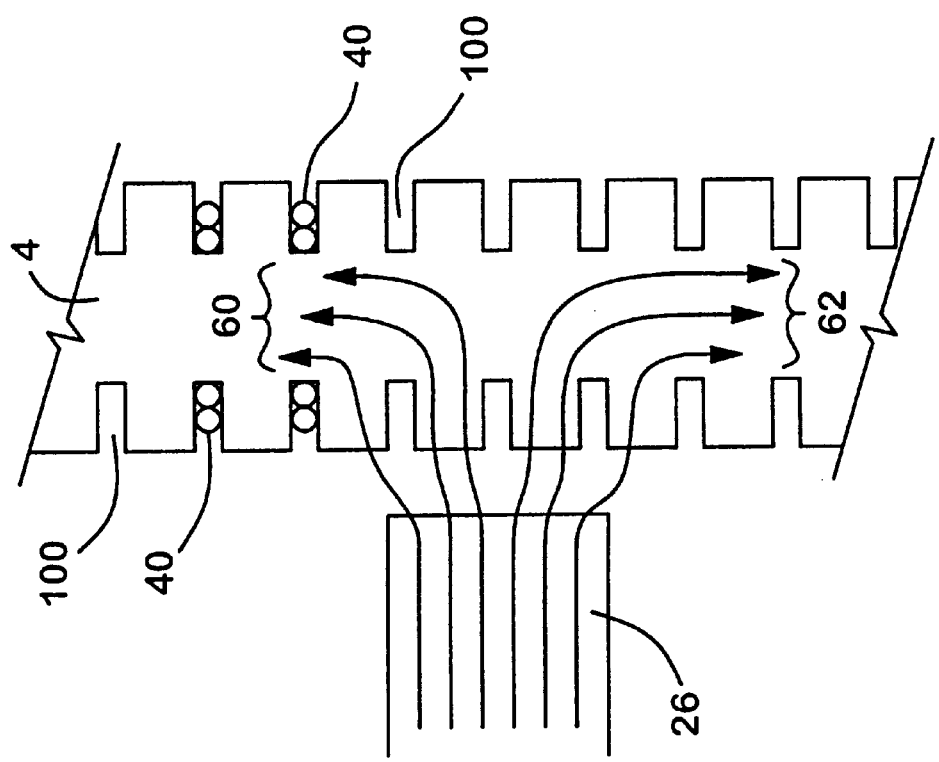
FIG. 10 shows a detail of slots in the outer stator ring to accommodate armature winding coils.

It will be understood for this alternate configuration that winding phases A and B and C over one another may require the air gap 50, 52 to be quite large in order to provide clearance between the windings, 40 and 42 and the rotor pole bars 26 and 27. The air gap dimension has design implications for the circumferential distribution of flux along the outer stator ring 4 and thus through the windings 40 and 42; thus the air gap dimension influences the voltage waveform produced by motion of the rotor. It is desirable to be able to control the air gap dimension independently of other design factors in order to control the induced voltage waveform of the alternator. In order to accommodate small air gap length, if required, FIG. 10 shows an alternate embodiment in which the outer stator ring 4 may be formed with surface grooves 100 running in a nearly radial direction along both air gap surfaces of the magnetic material into which the individual turns of windings 40, 42, 40A, 42A etc, of A, B, and C may be placed. It will be appreciated that this grooved outer 4 ring may be used with any winding scheme so that the air gap dimension can be controlled independently of the winding arrangement. As shown in FIG. 10 the magnetic material between the grooves allows the field induced flux 60, 62 to concentrate and pass around the windings, effectively reducing the air gap.

It will be appreciated that the field coil 8 allows for control of the excitation level and the output voltage level for this device when used as an alternator so that the output voltage can be held constant under varying conditions of shaft speed and load. Obviously the field excitation system including field coil 8 could be eliminated and either inner stator ring 6 or the rotor pole bars, 26 and 27 could be replaced with permanent magnets of appropriate polarity and used with the armature winding methods herein disclosed to produce a low-armature-inductance permanent magnet alternator wherein the output voltage would depend upon the speed of the shaft. Such devices find use in some systems and low armature inductance would be an advantage.

In an alternate embodiment of this invention, it may be used as a low inductance stepper motor. For this embodiment the field 8 is excited to produce magnetic polarization of the rotor pole bars 26 and 27. The armature coils 40 are then excited in complementary pairs 40 and 42 (in order to preserve the low inductance features of this invention) in specific sequence to attract the rotor pole bars 26 and 27 to a succession of positions around the circumference of the outer stator ring 4, thereby determining the position of the shaft 22. Since the torque is produced by attraction of the pole bars 26 and 27 the air gap along the outer stator ring 4, the moment arm is long and the potential torque is high. The pull-out torque is controllable by the level of field excitation in coil 8. The relatively low rotor inertia described in the four air gap alternator embodiment is useful in this stepper motor configuration.

In another embodiment, this invention may be used as a smooth and quiet synchronous motor. It will be appreciated that even with excitation of the field coil 8, the rotor assembly 2 has no preferred position along the circumference of the outer stator ring 4 unless there are currents in the armature windings 40 to establish local magnetic flux patterns 76. That means there is no cogging torque except that provided by the excitation of the armature. This can be used to establish a smoothly operating, quiet synchronous motor. For this embodiment the field 8 is excited to produce magnetic polarization of the rotor pole bars 26 and 27. The three armature phases i–i' 84, ii–ii' 89, and iii–iii' 94 are excited (preserving complementary pairs of armature windings 40 and 42 in order to achieve the low inductance benefits of this invention) by three phase sinusoidal power to create a magnetic flux wave that travels smoothly around the circumference of the outer stator ring 4 and attracts the rotor pole bars 26 and 27 to follow smoothly around the circumference of the outer stator ring 4, thereby causing shaft 22 to rotate smoothly. The pull out torque is controllable by the level of field excitation in coil 8.

It will be appreciated that in an additional embodiment this invention may be used in one of the above-cited motor modes and then, when regenerative breaking is required, the device may be easily switched to operate in its alternator mode. During regenerative braking the alternator output voltage may be controlled independently of shaft speed by varying the level of field excitation in field coil 8. The output voltage of the armature coils may be connected to an external rectifier circuit to provide controlled DC power for recharging batteries or other energy storage processes. An external feedback control circuit can modulate the field excitation current in order to regulate the output current and voltage as needed for proper recharging of storage batteries even as the shaft speed slows due to braking action.

Figure 11:
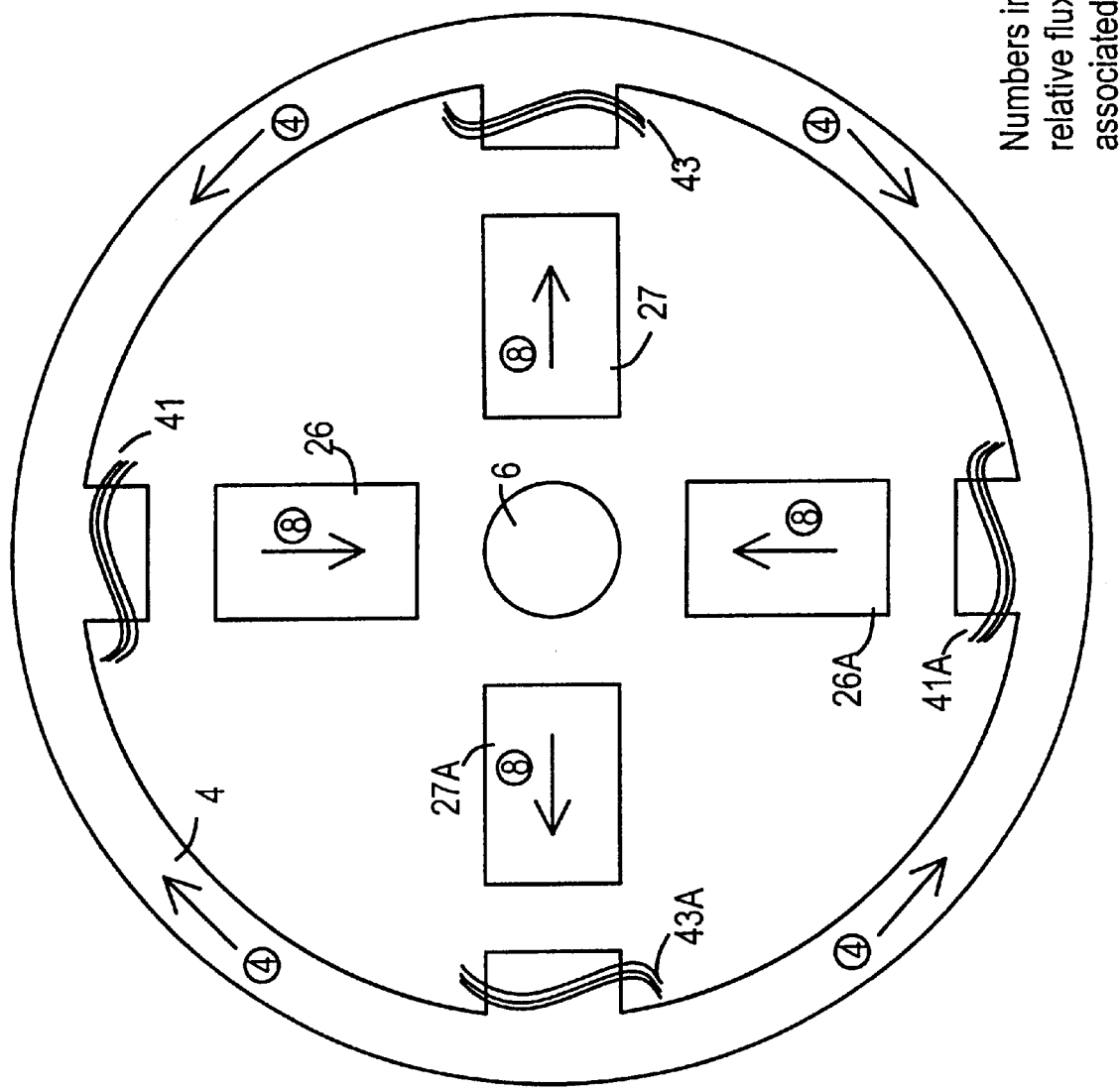
FIG. 11 presents the results of an analysis of the mutual inductance of rotor flux flows based on radially oriented armature coils.

Although the previous analysis of through-rotor armature inductance has been presented based on complementary pairs of poloidal armature windings (40, 42, etc.) a similar analysis of more traditional radially-oriented windings 41, 43 wound with one complementary winding pair per rotor pole pair, as shown in FIG. 11, gives a related result. The armature inductance per turn is 4 times greater than for a single poloidal winding turn, but each radially oriented winding will encircle twice as much of the field excited flux; this means that only one half as many radially oriented turns are needed. In the end, for an equivalent output voltage given the same field excitation the armature output inductance would be equivalent regardless of the choice of poloidal or radially oriented armature windings.

Figure 12:
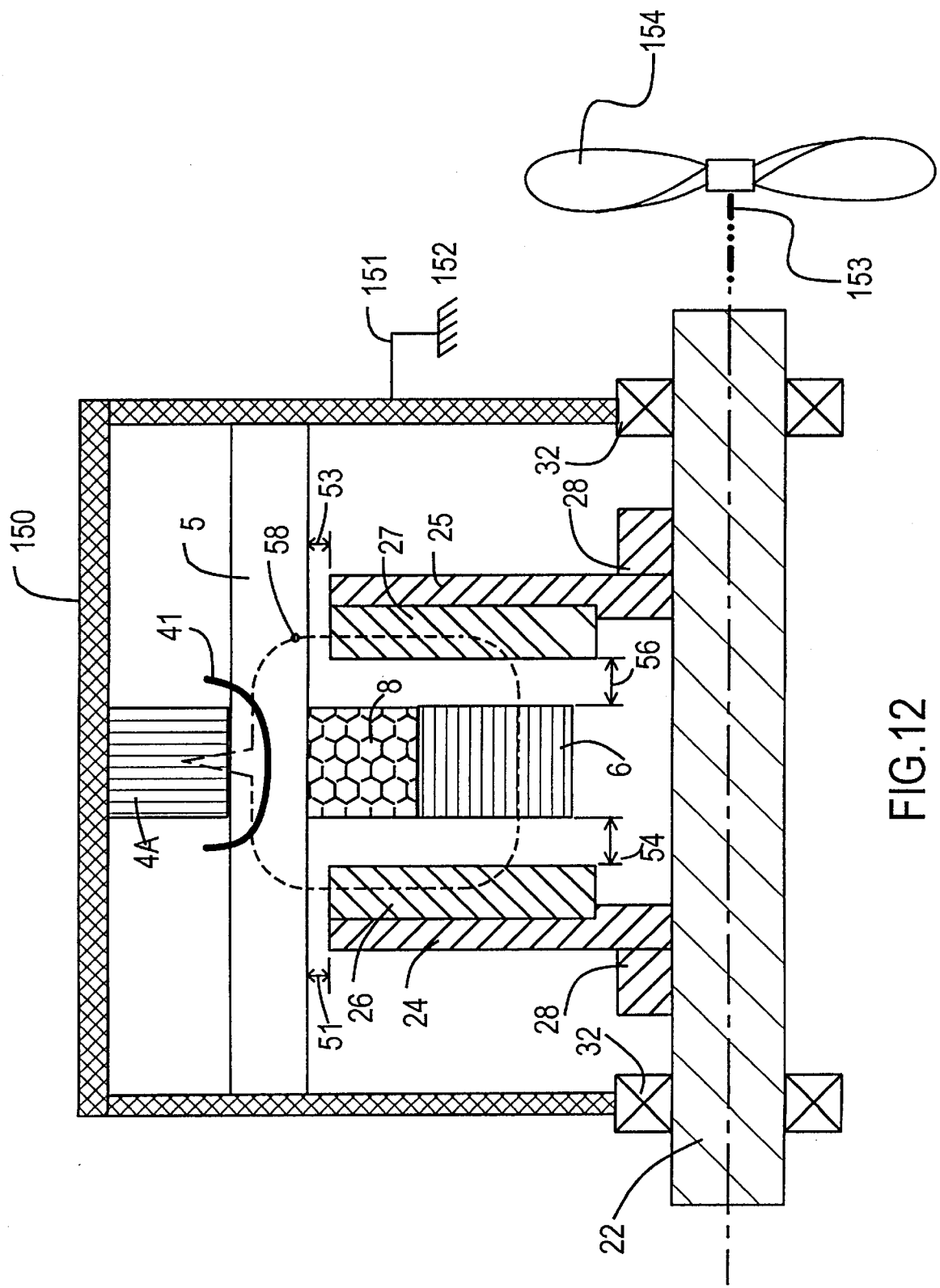
FIG. 12 shows a cross section of a third alternate embodiment using radially oriented poles.

FIG. 12 shows a cross section of a third alternate embodiment using radially oriented armature windings while preserving the low leakage flux, stationary field coil, and stationary inner ring features of the preferred embodiment. Outer annular ring 4A is made of laminated rings as shown. Horizontal pole bars 5 are made of laminated strips oriented as shown and are butted to the inside of outer annular ring 4A to form a circumferential and axial butt joint surface. Outer air gaps 51 and 53 are arranged radially in this embodiment. This embodiment enjoys many of the same advantages of the first embodiment, including the four series air gap arrangement to provide independence between the armature inductance and flux leakage pattern in the outer air gaps.

Figure 13:
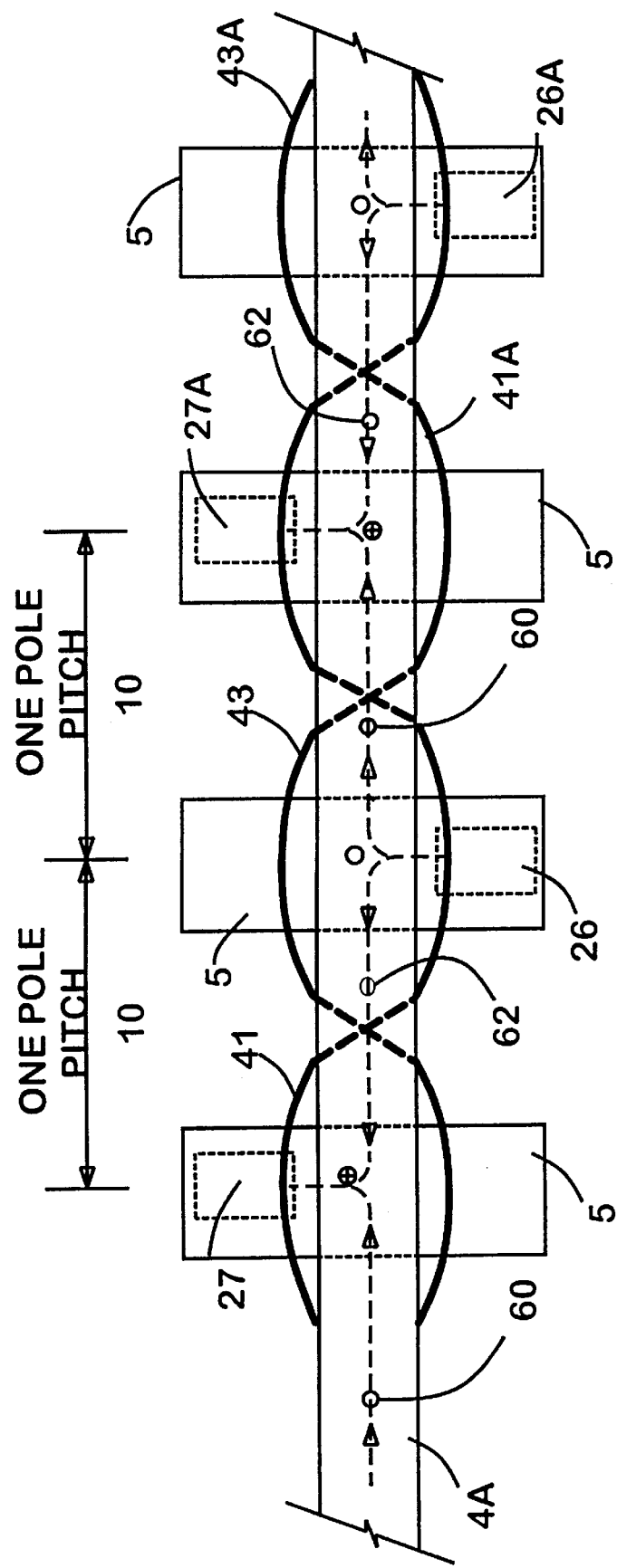
FIG. 13 shows an expanded circumferential view of the third alternate embodiment.

FIG. 13 shows an expanded circumferential view of the third alternate embodiment. The axial and circumferential pathways 60,62 of the magnetic flux through the horizontal rotor bars and outer ring are shown along with one possible arrangement for the radially oriented armature windings 41 and 43 wherein the armature windings effectively encircle the butt joint surface between the radial bars 5 and the outer annular ring 4A.

Although the invention has been described with respect to various embodiments, it should be realized that this invention is also capable of a wide variety of further and other embodiments within the spirit and scope of the appended claims

What is claimed is:

1. A low inductance electric machine comprising:
   a. a stator structure including:
      i. an armature structure made substantially of low loss magnetic material;
      ii. one or more phases of armature windings coupled to said armature structure, wherein each of said phases of armature windings includes a series circuit of one or more complementary pairs of armature windings arranged so that magnetic flux, within said armature structure, induced by a current through said complementary pairs of armature windings tends to cancel and thereby results in low inductance in each of said phases of armature windings independent of current in other of said phases of armature windings;
      iii. an inner annular ring of low loss magnetic material located coaxially within said armature structure; and
      iv. an annular field coil of insulated turns of copper, fixed coaxially between said inner annual ring and said armature structure to provide means for an externally applied electric current to excite and control a magnetic field within said stator structure;
   b. a rotor structure including two rotor disks, each of said disks arranged to hold a set of equal numbers of radial rotor pole bars associated with said stator structure; wherein each of said sets of rotor pole bars are shifted circumferentially with respect to one another by one pole spacing; wherein there is one of said complementary pairs of armature windings for each of said phases of armature windings for each of said pairs of rotor pole bars; wherein said rotor structure is separated from said stator structure by multiple air gaps; and wherein said rotor structure is configured to create magnetic poles which interact with magnetic flux induced by electrical currents in said armature windings and said field coil to provide means for electromechanical energy conversion;
   c. a plurality of magnetic pathways established to conduct flux induced by electrical current in said field coil, each of said magnetic pathways passing through a pair of said rotor pole bars, said pair including one member from each of said sets or rotor pole bars, and each of said magnetic pathways including four air gaps in series, with magnetic flux flowing serially through the following magnetic circuit:
      i. axially and circumferentially through said armature structure;
      ii. then through a first one of said air gaps, said first air gap established between said armature structure and a first member of said pair of rotor bars, said first member located on first of said rotor disks;
      iii. then substantially radially through said first rotor bar,
      iv. then axially through a second one of said air gaps, said second air gap established between said first rotor bar and said inner annular ring;
      v. then axially through said inner annular ring;
      vi. then through a third one of said air gaps, said third air gap established between said armature structure and a second member of said pair of said rotor bars, said second member located on second of said rotor disks;
      vii. then substantially radially through said second rotor bar; and
      viii. finally through a fourth one of said air gaps, said fourth air gap established between said armature structure and said second rotor bar to complete said magnetic circuit;
   wherein said second and third of said air gaps, which are associated with said inner annular ring, provide means to:
      ix. control the reluctance of said magnetic circuit substantially independently of the air gap length of said first and fourth air gaps, which are associated with said armature structure, in order to reduce the inductance of said armature circuits caused by flux induced in said magnetic circuit;

x. allow relative motion between said rotor structure and said inner annular ring; and xi. force flux flow to spread evenly across said second and third air gaps and thus across the face of said inner annular ring, thereby reducing flux concentrations and tendencies toward local magnetic saturation effects;

d. a shaft placed coaxially within said armature structure and said inner annular ring, said shaft preferably being of non-magnetic material in order to effectively remove it from said magnetic circuit;

e. means to couple said electrical machine to an external source of mechanical rotary power, or an external mechanical load, and means to hold said stator structure and said rotor structure so that one is stationary while the other rotates.

2. The machine as claimed in claim 1 in which said armature structure is an annular ring and said armature windings are poloidally wound around sectors of the circumference of said annular ring and wherein said first air gap and said fourth air gap are axial air gaps.

3. The machine as claimed in claim 2 in which said stator structure is fixed to said shaft, and said rotor structure rotates outside of and relative to said shaft and said stator structure and wherein said rotor disks are held fixed relative to each other by axial structural members at the outer radius of said disks.

4. The machine as claimed in claim 1 in which said armature structure includes axial bars of magnetic material butted radially to the inside of an annular ring of magnetic material to form a plurality of circumferential and axial butt joint surfaces, and where said armature windings are arranged to effectively encircle said butt joint surfaces, wherein said first air gap and said fourth air gap are radial air gaps.

5. The machine as claimed in claim 1 wherein the machine is an alternator and wherein when said rotor structure is energized and rotated it creates a moving pattern of flux associated with said armature structure and said armature windings to generate a desired output voltage controllable by said externally applied current in said field coil.

6. The machine as claimed in claim 1 wherein the machine is a stepper motor and wherein when said rotor structure is energized it creates magnetic poles and wherein individual ones of said phases of armature windings are energized to attract said rotor poles to specific positions along a circumferential dimension of said armature structure so as to effect movement of said shaft.

7. The machine as claimed in claim 1 wherein the machine is a synchronous motor and wherein there are three of said phase windings coupled to a three-phase source of sinusoidal power to create a moving flux wave along a circumferential dimension of said armature structure and wherein when said rotor structure is energized it creates magnetic poles that follow said moving flux wave and thus cause movement of said shaft.

8. The machine as claimed in claim 1 wherein the machine is an alternator and there are three phases of output armature windings offset from each other by one third of an electrical cycle, and wherein said three phases of output are connected to an external rectifier circuit such that two of said phases are conducting in series at any one moment and the third of said phases is not conducting at said moment, and wherein said phases of armature windings and said pairs of rotor pole bars are arranged so that magnetic flux in said rotor bars, and in said inner annular ring, induced by a current carried by said two phases conducting in series, is substantially canceled, resulting in low inductance in each of said conducting phases of armature windings.

9. A low inductance electric machine comprising:

a. a stator structure including:

i. an armature structure made substantially of low loss magnetic material;

ii. one or more phases of armature windings coupled to said armature structure, wherein each of said phases of armature windings includes a series circuit of one or more complementary pairs of armature windings arranged so that magnetic flux, within said armature structure, induced by a current through said complementary pairs of armature windings tends to cancel and thereby results in low inductance in each of said phases of armature windings independent of current in other of said phases of armature windings; and iii. an annular field coil of insulated turns of copper, fixed coaxially inside said armature structure to provide means for an externally applied electric current to excite and control a magnetic field within said stator structure;

b. a rotor structure including:

i. two rotor disks, each of said disks arranged to hold a set of equal numbers of radial rotor pole bars associated with said stator structure; wherein each of said sets of rotor pole bars are shifted circumferentially with respect to one another by one pole spacing; wherein there is one of said complementary pairs of armature windings for each of said phases of armature windings for each of said pairs of rotor pole bars; wherein said rotor structure is separated from said stator structure by multiple air gaps; and wherein said rotor structure is configured to create magnetic poles which interact with magnetic flux induced by electrical currents in said armature windings and said field coil to provide means for electromechanical energy conversion; and ii. one or more inner annular rings made of low loss magnetic material, each of said inner rings attached firmly to adjacent ones of said rotor disks and each of said inner rings extending coaxially within said armature structure;

c. a plurality of magnetic pathways established to conduct flux induced by electrical current in said field coil, each of said magnetic pathways passing through a pair of said rotor pole bars, said pair including one member from each of said sets or rotor poles bars, and each of said magnetic pathways including three magnetic gaps in series, with magnetic flux flowing serially through the following magnetic circuit:

i. axially and circumferentially through said armature structure;

ii. then through a first one of said magnetic gaps, said first magnetic gap being an air gap established between said armature structure and a first member of said pair of rotor bars, said first member located on first of said rotor disks;

iii. then substantially radially through said first rotor bar, iv. then axially through said inner annular rings and a second one of said magnetic gaps, said second gap being air, vacuum or a non-magnetic spacer;

v. then substantially radially through said second rotor bar; and vi. finally through a third one of said magnetic gaps, said third gap being an air gap established between said armature structure and said second rotor bar to complete said magnetic circuit;

wherein said second of said magnetic gaps, which is associated with said inner annular rings, provides means to control the reluctance of said magnetic circuit substantially independently of the air gap length of said first and third magnetic gaps, which are air gaps associated with said armature structure, in order to reduce the inductance of said armature circuits caused by flux induced in said magnetic circuit;

d. a shaft placed coaxially within said armature structure and said inner annular rings, said shaft preferably being of non-magnetic material in order to effectively remove it from said magnetic circuit;

e. means to couple said electrical machine to an external source of mechanical rotary power, or an external mechanical load, and means to hold said stator structure and said rotor structure so that one is stationary while the other rotates.

10. The machine as claimed in claim 9 in which said armature structure is an annular ring and said armature windings are poloidally wound around sectors of the circumference of said annular ring and wherein said first magnetic gap and said third magnetic gap are axial air gaps.

11. The machine as claimed in claim 9 in which said armature structure includes axial bars of magnetic material butted radially to the inside of an annular ring of magnetic material to form a plurality of circumferential and axial butt joint surfaces, and where said armature windings are arranged to effectively encircle said butt joint surfaces, wherein said first magnetic gap and said third magnetic gap are radial air gaps.

12. The machine as claimed in claim 9 wherein the machine is an alternator and wherein when said rotor structure is energized and rotated it creates a moving pattern of flux associated with said armature structure and said armature windings to generate a desired output voltage controllable by said externally applied current in said field coil.

13. The machine as claimed in claim 9 wherein the machine is a stepper motor and wherein when said rotor structure is energized it creates magnetic poles and wherein individual ones of said phases of armature windings are energized to attract said rotor poles to specific positions along a circumferential dimension of said armature structure so as to effect movement of said shaft.

14. The machine as claimed in claim 9 wherein the machine is a synchronous motor and wherein there are three of said phase windings coupled to a three-phase source of sinusoidal power to create a moving flux wave along a circumferential dimension of said armature structure and wherein when said rotor structure is energized it creates magnetic poles that follow said moving flux wave and thus cause movement of said shaft.

15. A low inductance electrical machine comprising:

a. a stator structure including:
  i. an armature structure
  ii. one or more phases of armature windings coupled to said armature structure;

b. a field coil of insulated turns of copper to provide means for an externally applied electric current to excite and control a magnetic field within said stator structure;

c. a rotor structure separated from said stator structure by multiple air gaps; and wherein said rotor structure includes rotor poles of magnetic material configured to create magnetic poles which interact with magnetic flux induced by electrical currents in said armature windings and said field coil to provide means for electromechanical energy conversion;

d. a plurality of magnetic pathways established to conduct flux induced by electrical current in said field coil, each of said magnetic pathways passing through at least one of said rotor poles, and each of said magnetic pathways including three or more magnetic gaps in series, with magnetic flux flowing serially through a magnetic circuit as follows:
  i. through said armature structure and said phase windings;
  ii. then through a first one of said magnetic gaps, said first magnetic gap being an air gap established between said armature structure and said rotor structure;
  iii. then through one or more of said magnetic poles on said rotor structure and through one or more additional ones of said magnetic gaps and through intervening magnetic material associated with either said rotor or said stator, said additional gaps being magnetic path sections through air, vacuum or non-magnetic spacer material;
  iv. finally through a last one of said magnetic gaps, said last gap being an air gap established between said armature structure and said rotor structure to complete said magnetic circuit;

wherein said additional ones of said magnetic gaps provide means to control the reluctance of said magnetic circuit substantially independently of the air gap length of said first and last magnetic gaps, which are air gaps associated with said armature structure, in order to reduce the inductance of said armature circuits caused by flux induced in said magnetic circuit;

e. a shaft, said shaft preferably being of non-magnetic material in order to effectively remove it from said magnetic circuit; and f. means to couple said electrical machine to an external source of mechanical rotary power, or an external mechanical load, and means to hold said stator structure and said rotor structure so that one is stationary while the other rotates.

16. A low inductance electrical machine comprising:

a. a stator structure having an armature structure and one or more phases of armature windings coupled to said armature structure;

b. a rotor structure spaced from said stator structure by air gaps;

c. a plurality of magnetic pathways through said stator structure and said rotor structure, each of said pathways including three or more magnetic gaps in series;

d. a field coil magnetically coupled to said pathways;

e. means to couple said electrical machine to an external source of mechanical rotary power, or an external mechanical load, and means to hold said stator structure and said rotor structure so that one is stationary while the other rotates.

17. The machine as claimed in claim 16 wherein two of said magnetic gaps are members of the group of said air gaps.

18. The machine as claimed in claim 17 wherein any one or more of a remainder of said magnetic gaps may be filled with air or a solid non-magnetic material, or may be substantially evacuated.

19. The machine as claimed in claim 18 wherein said shaft is made of a substantially non-magnetic material.

20. The machine as claimed in claim 17 wherein a remainder of said magnetic gaps substantially control reluctance of a magnetic circuit established through said stator structure, said field coil, and said rotor structure substantially independent of the spacing of said air gaps.

* * * * *